United States Patent [19]

Takadachi et al.

[11] Patent Number: 5,144,555
[45] Date of Patent: Sep. 1, 1992

[54] METHOD AND APPARATUS FOR SUPPORTING OF MAKING FORMATTED DOCUMENT

[75] Inventors: Masato Takadachi, Kawasaki; Mihoko Iwasaki, Yokohama; Hiroyuki Maezawa, Tama; Yoshimitsu Shindo, Chiba; Ryoji Eguchi, Kawasaki; Hirokazu Mimura, Yokohama; Noriyuki Takahashi, Sakai; Tetsuo Tanaka, Yokohama, all of Japan

[73] Assignees: Hitachi, Ltd.; Hitachi Keiyo Engineering Co., Ltd., Tokyo, Japan

[21] Appl. No.: 613,166

[22] Filed: Nov. 13, 1990

[30] Foreign Application Priority Data

Nov. 16, 1989 [JP] Japan .................................. 1-299060
Mar. 16, 1990 [JP] Japan .................................. 2-64253

[51] Int. Cl.$^5$ ............................................. G06F 1/00
[52] U.S. Cl. ...................................... 364/419; 395/600
[58] Field of Search ... 364/200 MS File, 900 MS File, 364/ 419; 395/600

[56] References Cited

U.S. PATENT DOCUMENTS

| | | | |
|---|---|---|---|
| 4,731,735 | 3/1988 | Borgendale | 364/200 |
| 4,815,029 | 3/1989 | Barker | 364/900 |
| 4,939,689 | 7/1990 | Davis | 364/900 |
| 4,959,769 | 9/1990 | Cooper | 364/200 |
| 4,969,093 | 11/1990 | Barker . | |
| 4,996,662 | 2/1991 | Cooper | 364/900 |

FOREIGN PATENT DOCUMENTS 61-194532 8/1986 Japan .

OTHER PUBLICATIONS

Janet Fiderio, "A Grand Vision", Byte, a McGraw-Hill publication, Oct. 1988, pp. 237-245.
"A Distributed Network Environment and its Community", Information Processing, vol. 28, No. 4, Apr. 1987, pp. 463-471.
"New-SWB Program Design Support Tools/MCD Tools", The Institute of Information Processing Engineers of Japan, 37th National Meeting, 1988, pp. 882-883.
"Integrated Operation Environment 'New Wave'", Nikkei Byte, Apr. 1990, pp. 278-313.

Primary Examiner—Dale M. Shaw
Assistant Examiner—Andrew Bodendorf
Attorney, Agent, or Firm—Fay, Sharpe, Beall, Fagan, Minnich & McKee

[57] ABSTRACT

A support method of and apparatus for making/editing a formatted document including a plurality types of formatted documents having a mutual relation therebetween. An input device inputs beforehand a relation between document forms before a formatted document is made, the inputted relation is stored in a storage device, and a relation between formatted documents is automatically generated by referring to the relation stored in the storage device.

27 Claims, 45 Drawing Sheets

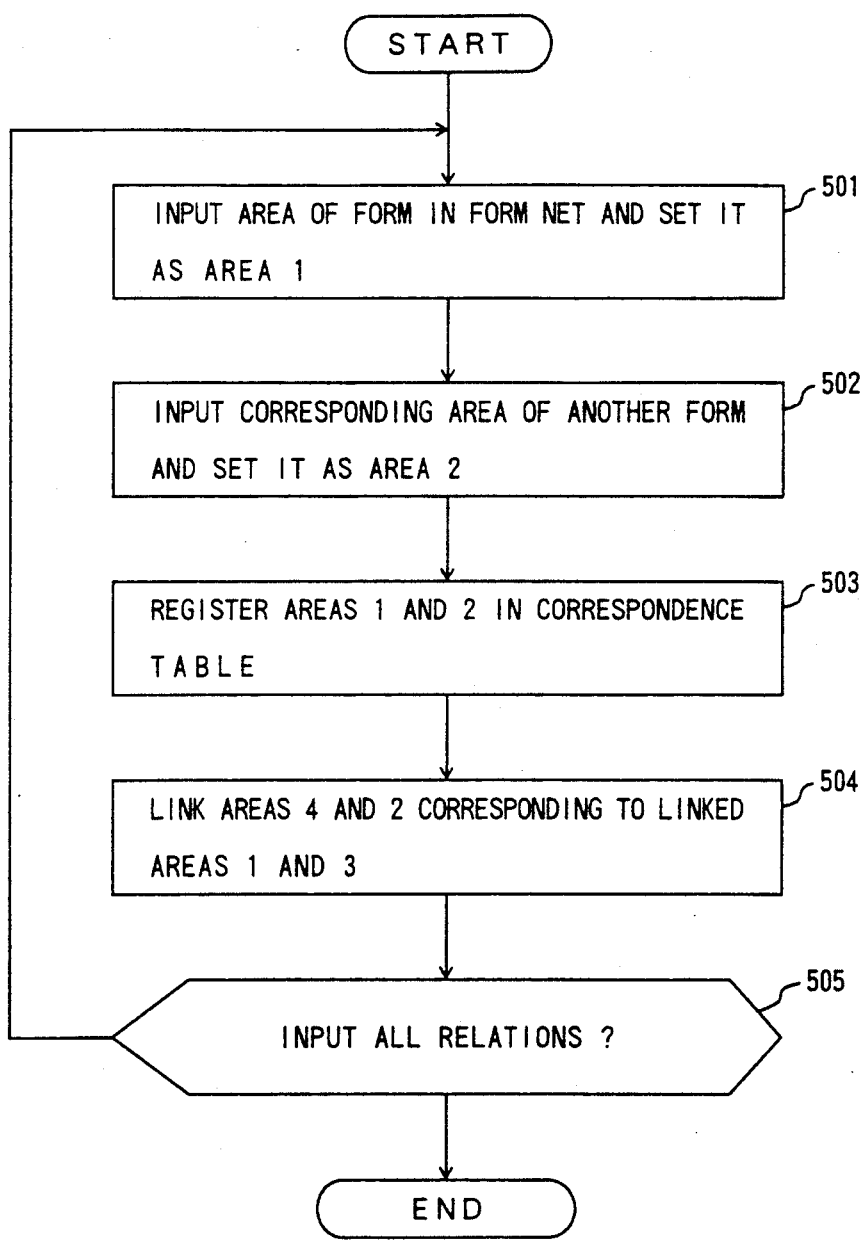

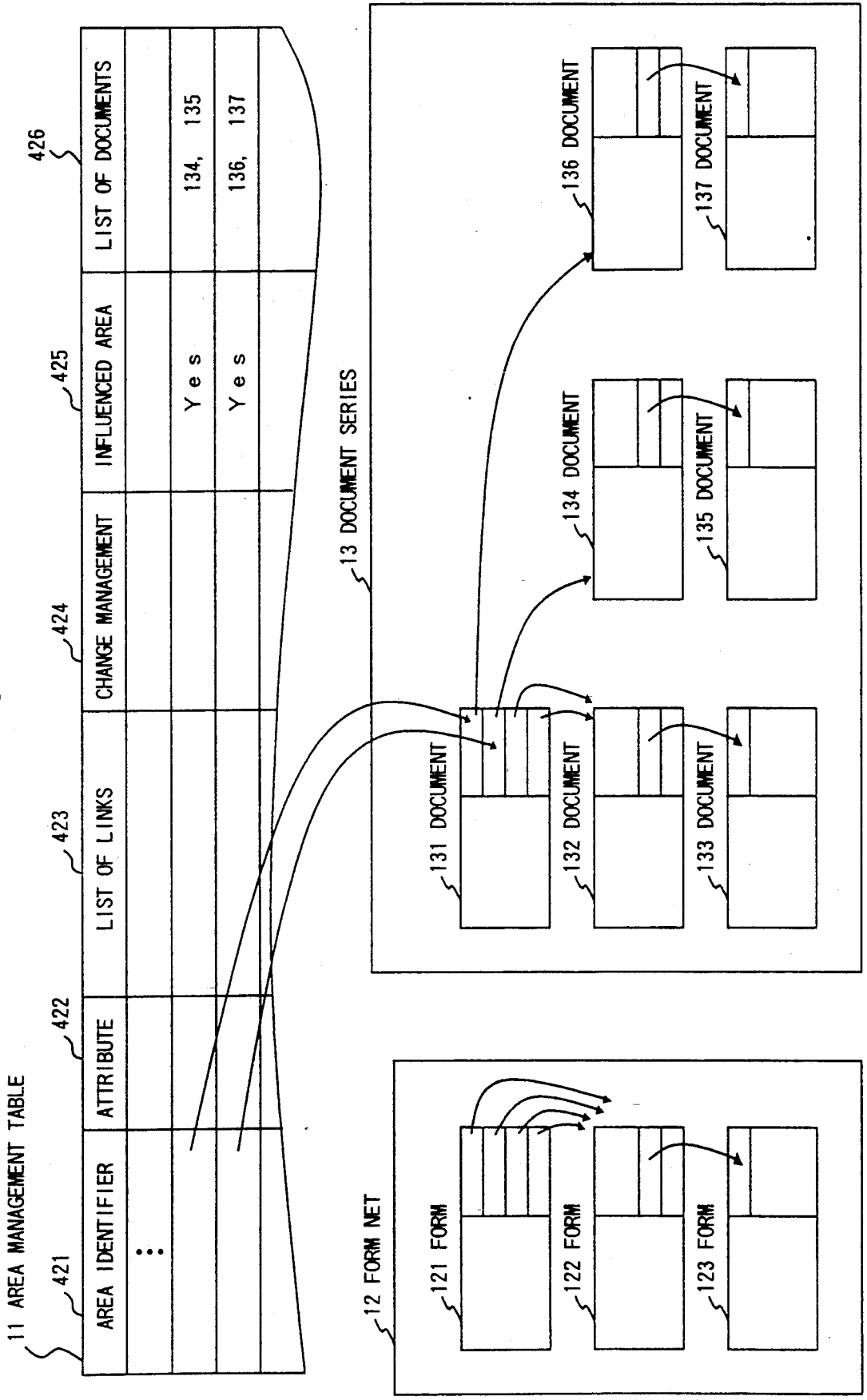

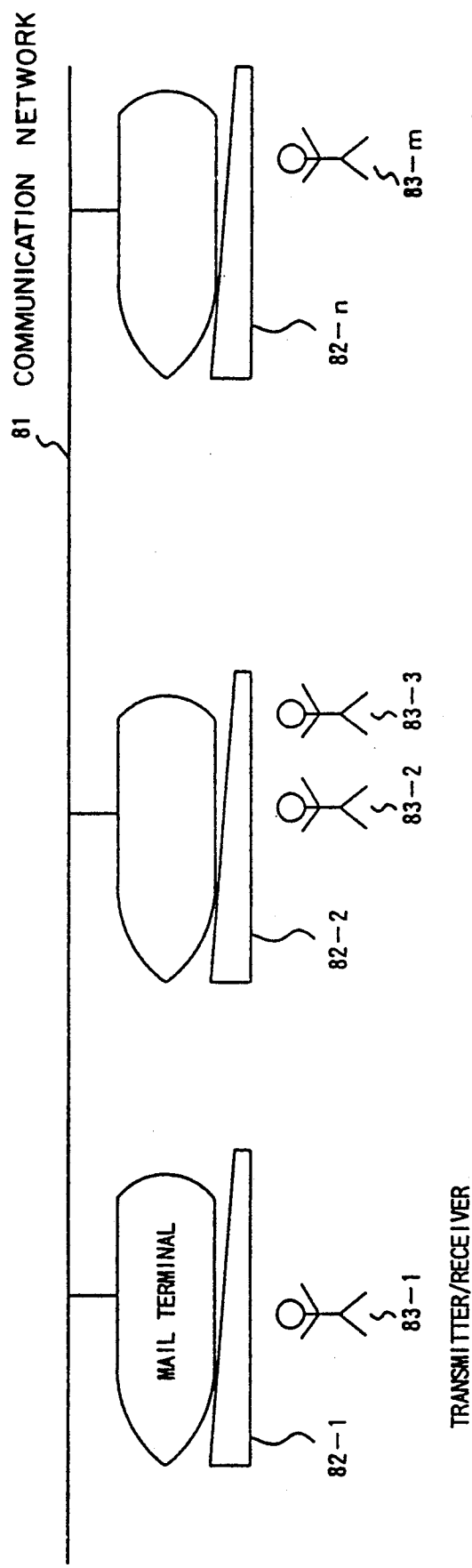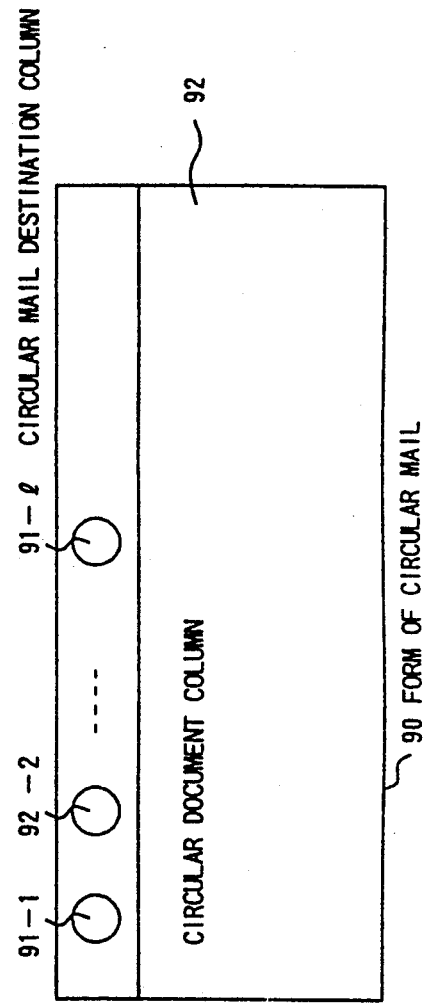

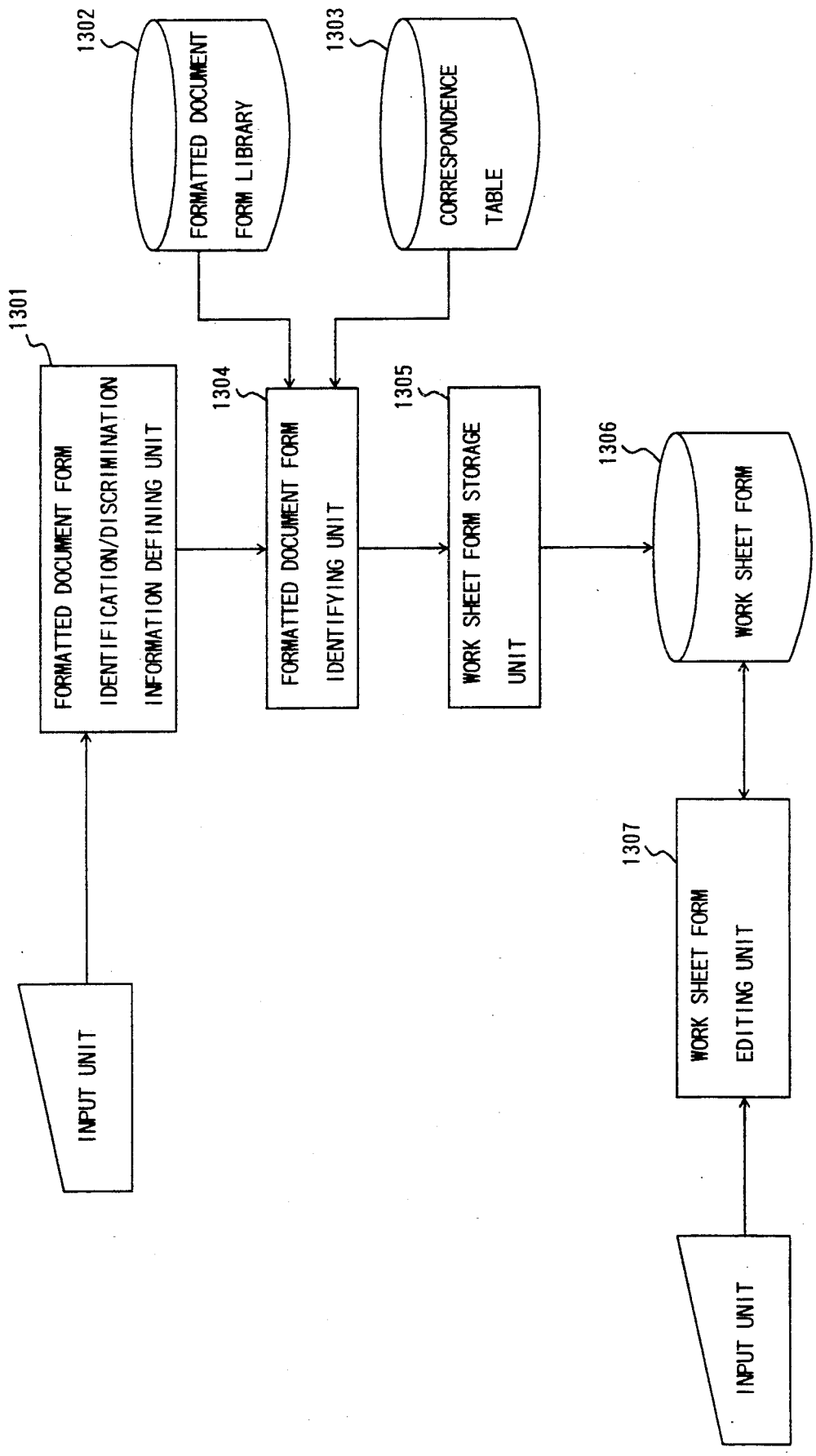

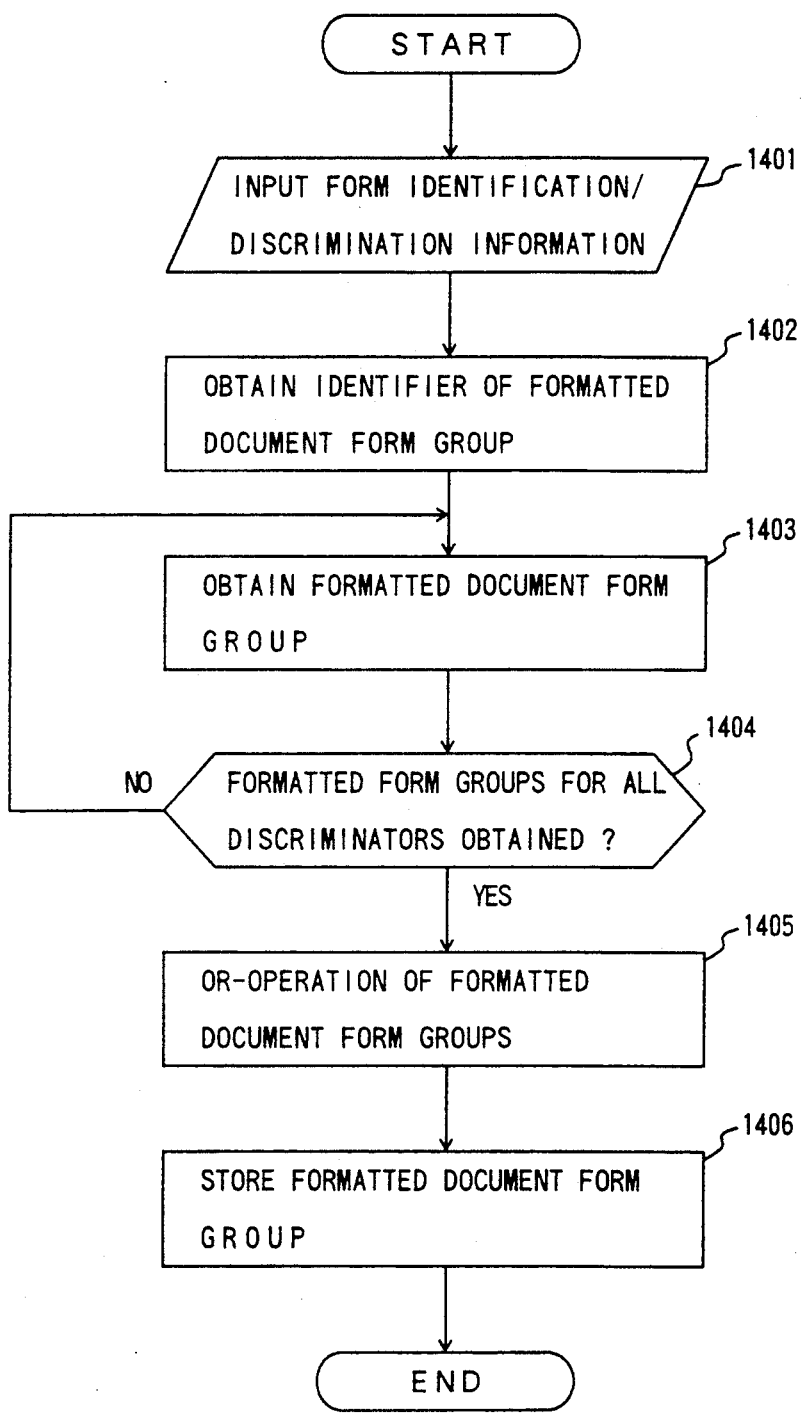

FIG. 16

| WORK NAME : | | | |
|---|---|---|---|
| FILE NAME | CONSTITUENT ITEM | KEY ITEM | CAPACITY |
|  |  |  |  |
|  |  |  |  |
|  |  |  |  |

FILE LIST

| WORK NAME : | | RECORD NAME : | |
|---|---|---|---|
| ITEM NAME | SYMBOL NAME | ATTRIBUTE | LENGTH |
|  |  |  |  |
|  |  |  |  |
|  |  |  |  |

DB·RECORD SPECIFICATION

| MODULE NAME : | | | SUBROUTINE |
|---|---|---|---|
| VARIABLE NAME | TYPE | CONTENTS | |
|  |  |  | PROCESS |
|  |  |  | |
|  |  |  | |

MODULE SPECIFICATION

| FORMATTED DOCUMENT FORM | AREA CONSTITUTING FORM |
|---|---|
| FILE LIST | WORK NAME |
|  | FILE NAME |
|  | CONSTITUENT ITEM |
|  | KEY ITEM |
|  | CAPACITY |
| DB·RECORD SPECIFICATION | WORK NAME |
|  | RECORD NAME |
|  | ITEM NAME |
|  | SYMBOL NAME |
|  | ATTRIBUTE |
|  | LENGTH |
| MODULE SPECIFICATION | MODULE NAME |
|  | VARIABLE NAME |
|  | TYPE |
|  | CONTENTS |
|  | SUBROUTINE |
|  | PROCESS |
| ⋮ | ⋮ |

FORMATTED DOCUMENT FORM LIBRARY

FORMATTED DOCUMENT FORM GROUP (1)

FORMATTED DOCUMENT FORM GROUP (2)

FIG. 19

| OBJECT FIELD | FORMATTED DOCUMENT FORM GROUP |
|---|---|
| PRODUCTION PLAN | A  B  C  D  ...... |
| PRODUCTION MANAGEMENT | A  C  D  ............ |
| TRAFFIC CONTROL | B  C  E |
| WAGE CALCULATION | B  D  E  F |
| COMPONENT MANAGEMENT | C  G  H |
| ∫ | ∫ |

FORMATTED DOCUMENT FORM LIBRARY GROUPED INTO OBJECT FIELDS

FIG. 22

| WORK SHEET FORM A | WORK SHEET FORM B | RELATION |
|---|---|---|
| PROBLEM DEFINITION TABLE | OPERATION PLAN | DEVELOPMENT |
| PHYSICAL DATA FLOW | LOGICAL DATA FLOW | OVERWRITE |
| WORK OPERATION DESCRIPTION TABLE | PRESENT EEFOX | PICKUP |
| WORK LIST | PRESENT EEFOX | PICKUP |
| FUNCTION HIERARCHY GRAPH | LOGICAL DATA FLOW | POSTING |
| FUNCTION REQUEST DEFINITION TABLE | OBJECT FUNCTION RELATION TABLE | DETAILING |
| FILE LIST | RECORD SPECIFICATION | POSTING |
| ... | ... | ... |

RELATION LIBRARY

CLASSIFICATION OF RELATION BETWEEN WORK SHEET FORMS

FIG. 30
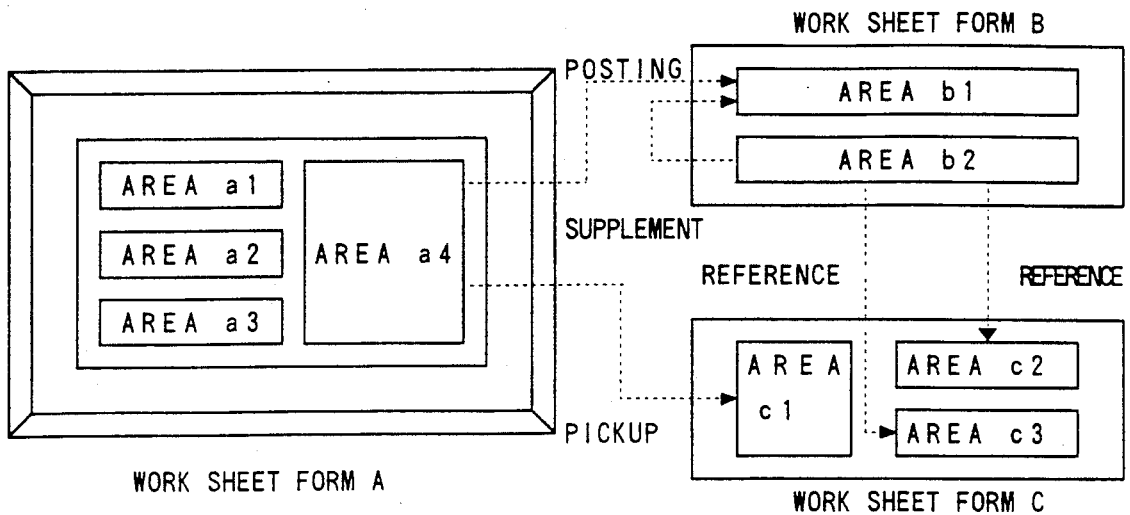
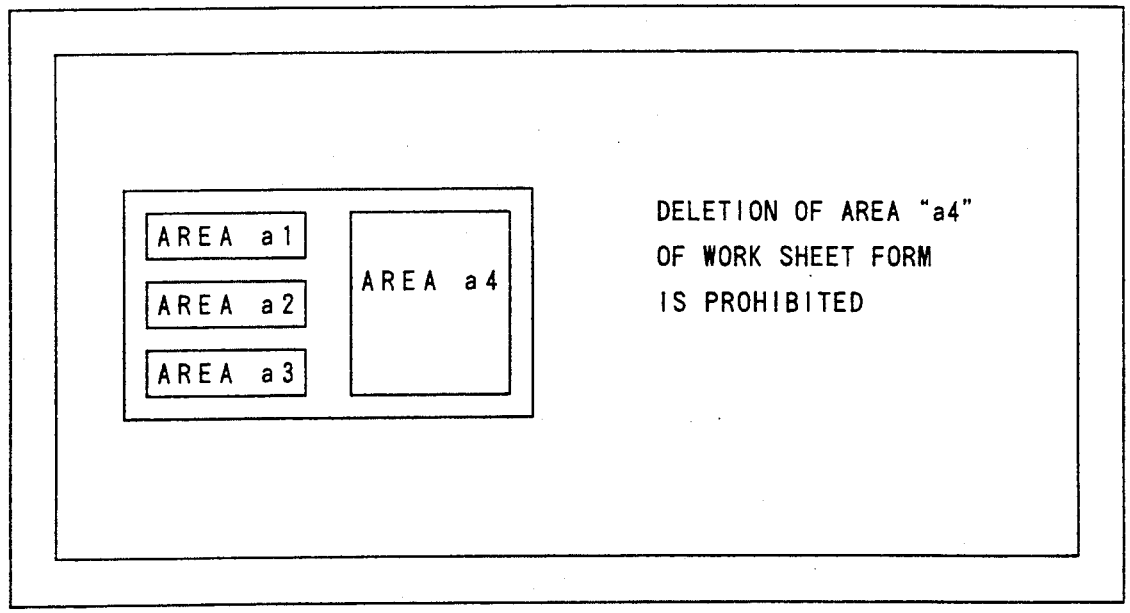
DELETE AREA "a4" OF WORK SHEET FORM

FIG. 34 A

| PHASE NAME | STEP NAME |
|---|---|
| SYSTEM PLAN | PHASE INITIATION |
| SYSTEM PLAN | SETTING WORK SPECIFICATION |
| : | : |

| STEP NAME | WORK NAME |
|---|---|
| SETTING WORK SPECIFICATION | STEP INITIATION |
| SETTING WORK SPECIFICATION | SETTING WORK FUNCTION |
| : | : |

| WORK NAME | WORK SHEET |
|---|---|
| STEP INITIATION | NONE |
| SETTING WORK FUNCTION | WORK FUNCTION RELATION DIAGRAM |
| : | : |

PHYSICAL TABLE OF PROCESS INFORMATION

FIG. 41

INTER-AREA RELATION LIBRARY

| WORK SHEET NAME | CONSTITUENT AREA | WORK SHEET NAME | CONSTITUENT AREA | PROCESS |
|---|---|---|---|---|
| FILE LIST | FILE NAME | FILE RECORD LAYOUT TABLE | FILE NAME | PICKUP |
| FILE LIST | CONSTITUENT ITEM | FILE RECORD LAYOUT TABLE | RECORD LAYOUT | POSTING |
| FILE LIST | FILE CAPACITY | FILE RECORD LAYOUT TABLE | RECORD LAYOUT | REFERENCE |
| FILE LIST | FILE TYPE | FILE RECORD LAYOUT TABLE | FILE TYPE | PICKUP |

PROCESS ACTIVATION

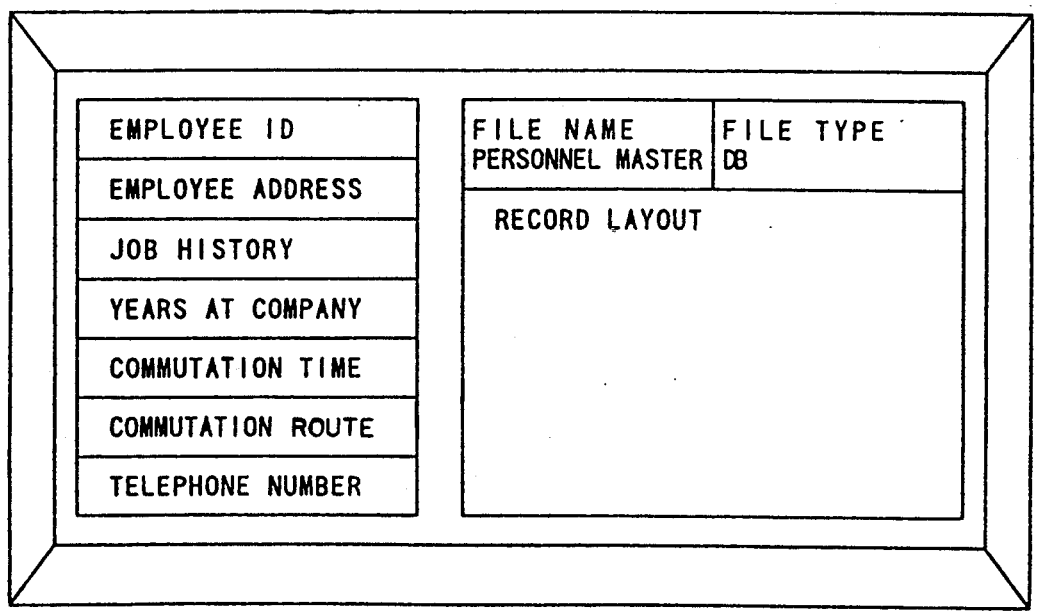

FIG. 43

| FORMATTED DOCUMENT FORM | AREA CONSTITUTING FORMATTED DOCUMENT FORM | GRAPHICS INFORMATION | |
| --- | --- | --- | --- |
| | | START POINT | END POINT |
| MODULE SPECIFICATION | MODULE NAME | 0, 100 | 200, 100 |
| | VARIABLE NAME | 0, 100 | 50, 500 |
| | TYPE | 50, 100 | 100, 500 |
| | CONTENTS | 100, 100 | 200, 500 |
| | SUBROUTINE | 200, 0 | 500, 200 |
| | PROCESS FLOW | 200, 100 | 500, 400 |
| | ERROR COUNTERMEARURE | 200, 400 | 500, 500 |
| ⋮ | ⋮ | ⋮ | ⋮ |

GRAPHICS INFORMATION TABLE

| MODULE NAME : | | | SUBROUTINE |
|---|---|---|---|
| VARIABLE NAME | TYPE | CONTENTS | |
| | | | PROCESS FLOW |
| | | | |
| | | | ERROR COUNTERMEASURE |
| | | | |

DELETE AREA "ERROR COUNTERMEASURE"

| MODULE NAME : | | | SUBROUTINE |
|---|---|---|---|
| VARIABLE NAME | TYPE | CONTENTS | |
| | | | PROCESS FLOW |
| | | | |
| | | | |

FIG. 46

| | ITEM | CONTENTS |
|---|---|---|
| COVER SHEET INFORMATION | DOCUMENT INFORMATION | SYSTEM ANALYSIS REPORT |
| | SYSTEM NAME | INVENTORY MANAGEMENT |
| | AUTHOR NAME | TARO HITACHI |
| | APPROVER | HANAKO HITACHI |
| OUTPUT INFORMATION | SHEET SIZE | A4 |
| | OUTPUT FORMAT | VERTICAL WRITING |
| | CHARACTER SIZE | 12×12 |
| COLLECTION INFORMATION | WORK SHEETS TO BE COLLECTED | REQUEST SPECIFICATION |
| | | SYSTEM PLAN DIAGRAM |
| | | WORK FUNCTION RELATION DIAGRAM |
| | | MACHINE FUNCTION ILLUSTRATION |
| | | |

DOCUMENT DEFINTITON INFORMATION

METHOD AND APPARATUS FOR SUPPORTING OF MAKING FORMATTED DOCUMENT

BACKGROUND OF THE INVENTION

The present invention relates to a method of and apparatus for supporting of making a formatted document, and more particularly to a method of and apparatus for supporting of making formatted documents such as specifications, account sheets, and the like which are related to each other. The invention also relates to a method of and apparatus for supporting of making a formatted document suitable for making a formatted document form matching the type of software systems to be developed and for producing a relation between such formatted document forms.

Attention has been recently paid to a method of managing information by using a concept of "hypertext". For example, necessary information for giving a comment or referring to other information can be readily searched if a part of a document is arranged to be related to another document (such relation is expressed by terms "link" or "extend a link" hereinafter where applicable). A concept "hypertext" implies such information management by a computer, and includes a set of information (hereinafter called a "node") such as a document, picture, drawing, and a set of links between such information. As described in "A Grand Vision", by Janet Fiderio, Byte, October 1988, pp. 237 to 245, McGRAW-HILL PUBLICATION under information management by using the concept "hypertext", it becomes possible for a user to display main information on a display unit and then display associated information such as comments when necessary. It is also possible for a user to define the type of link and give a specific relation between nodes.

A method of supporting of generating a form of a formatted document such as a specification to be described when developing software, is described in "A Distributed Network Environment and its Community", Information Processing, April 1987, vol. 28. No. 4, pp. 463 to 471 wherein the forms of formatted documents such as specifications to be described when developing software are stored beforehand in a predetermined file server, and a user searches and derives a desired formatted document form from the file server when necessary.

There is known a system having a function to manage the relation between formatted document forms, as described in "New SWB Program design Support Tools/MCD Tools", Information Processing Society of Japan, 37th National meeting, Speech Papers, pp. 882 to 883, 1988, wherein an editor is automatically started in accordance with a fixed relation between a formatted document form area and another formatted document form area.

There is disclosed in JP-A-61-194532 a method of managing and guiding manufacturing process software by its process name.

SUMMARY OF THE INVENTION

The above-described "hypertext" technique is however associated with the following problems. Even if the relation between documents or between items in a document is fixed, a user is required to extend necessary links one after another. Furthermore, if the relation between documents is fixed, a user is required to copy necessary nodes one after another and extend links because the number of documents changes with the contents of associated documents.

With the method according to the second prior art wherein the forms of formatted documents are stored in a file server, it is necessary for a user to define the items and layout of a form of a formatted document to be made. Furthermore, this method does not support the relation between formatted document forms and between items.

With the third prior art, it is impossible for a user to define a particular relation between formatted document forms and areas because they are specific to a system.

In "Integrated Operation Environment New Wave", Nikkei Byte, May, 1990 published after the priority date of this application, there is disclosed a system having a function to manage the relation between formatted documents and areas which system can re-define the areas constituting a formatted document by means of editing such as deleting, adding and the like. With this system, it is possible for a user to delete and add desired areas constituting a formatted document. However, the concept of the formatted document form is not disclosed at all. Further, since there is not provided a function to check if the deletion and/or addition operation is adequate or not, there is a possibility of overwriting the edited areas even if they have an important relation with other areas. Thus, it is not possible to know the range of influence to other areas by such area redefinition.

With JP-A-61-194532, the management/guide of manufacturing process software is executed only by the process name, and it cannot be executed on the specification unit basis.

The present invention has been made to solve the above problems.

It is a first object of the invention to provide a support method of and apparatus for making a formatted document wherein links are not required to be extended each time a document is made, in order to generate a relation between formatted documents.

It is a second object of the invention to provide a support method of and apparatus for making a formatted document capable of readily changing the relation between formatted document forms or between formatted documents.

It is a third object of the invention to reduce a burden of a user for making a form of a formatted document such as a specification to be described when developing software, by making the form in accordance with the type of the system to be developed.

It is a fourth object of the invention to allow a user to customize a form of a formatted document such as a specification to be described when developing software by editing (adding, updating and the like) the form by a dedicated editor, and to automatically obtain the relation between the newly edited and defined form and already defined forms.

It is a fifth object of the invention to obtain the relation between areas constituting the form of a formatted document such as a specification to be described when developing software, at the time of defining it, and to store the relation in a library which stores the relation between areas of formatted document forms.

It is a sixth object of the invention to judge if the redefinition, by a user, of areas constituting the form of a formatted document such as a specification to be described when developing software, is proper or not basing upon the relation between areas to be re-defined and other areas, to thereby notify the range of influence to other areas by such re-definition, to guide proper re-definition, and to prevent easy-going re-definition.

It is a seventh object of the invention to manage and guide manufacturing process software on the specification unit basis by identifying a relation of a specification to be described for the manufacturing process software by its process name, and to customize the manufacturing processes to have the structure as desired by a user.

According to an aspect of the invention, in order to achieve the first object, the relation between document forms is registered and stored beforehand. In editing a formatted document, the relation between document forms is automatically obtained while referring to the registered relation.

According to another aspect of the invention, in order to achieve the second object, the relation between formatted document forms and between documents is defined and stored independently from an editor which edits a document.

According to another aspect of the invention, in order to achieve the third object, forms of formatted documents such as specifications to be described when developing software are stored in a formatted document form library.

According to another aspect of the invention, in order to achieve the fourth object, the relation between areas of formatted documents is stored in a relation library.

According to another aspect of the invention, in order to achieve the fifth object, a new relation is generated in accordance with a relation searched from the relation library and in accordance with a relation generation rule.

According to another aspect of the invention, in order to achieve the sixth object, a range of influence to other areas by re-definition is identified and notified.

According to another aspect of the invention, in order to achieve the seventh object, there is obtained a relation between manufacturing process software and specification to be described for the process.

The first object is achieved in such a manner that the relation between document forms is defined and registered beforehand, the relation between a formatted document to be made and other formatted documents is automatically obtained in accordance with the defined and registered relation, thereby dispensing with extending links each time a formatted document is made.

The second object is achieved in such a manner that the relation between formatted document forms and between documents is defined independently from an editor which edits a document, thereby allowing to readily change the relation between formatted document forms and between documents.

The third object is achieved in such a manner that the forms of formatted documents such as specifications to be described when developing software are stored in a formatted document form library, a form group of formatted documents corresponding to the type of a system to be developed and inputted by a user is identified by referring to the formatted document form library, and the identified formatted document form is stored.

The fourth object is achieved in the following manner. Forms are stored in the formatted form library, and the relation between formatted document areas is stored in the relation library. In editing (such as adding, updating and the like) a form by a dedicated editor, it is checked from the relation library if there is any relation between areas constituting a newly defined formatted document and items or areas of already defined formatted document forms. If there is any relation, the relation between them is established and stored. Furthermore, the relation between formatted document forms is established in accordance with whether there is any relation between items or areas of formatted document forms.

The fifth object is achieved in the following manner. The relation between formatted document forms and those between areas constituting the forms are registered in the relation library. The relations between formatted document (specification) forms and between areas are searched from the relation library to make/edit a formatted document to be described when developing software. If the relations are not yet registered in the relation library, an indirect relation is searched from the relation library to generate the relation in concern by using a relation generation rule.

The sixth object is achieved in the following manner. In re-defining a formatted document form, the relation between an area to be re-defined and another area is searched from the interrelation library to thereby judge if re-defining can be executed in accordance with the relation in concern. If the redefinition is possible, the range of influence to another area by the re-definition is identified by referring to the inter-area relation library and provided to a user.

The seventh object is achieved in the following manner. The names of processes for developing software are hierarchically managed, and a relation is generated between the lowest level process and a specification to be described at the lowest level process.

BRIEF DESCRIPTION OF THE DRAWINGS

FIG. 5 is a flow chart showing the procedure of changing a form net according to a second embodiment of this invention;

FIG. 10 shows an embodiment of a method of managing formats and a form net;

FIG. 11 shows the system arrangement of an electronic mail system for circulating a document, according to the fifth embodiment of this invention;

FIG. 12 shows an embodiment of the form of a circular document;

FIG. 13 shows the functional block diagram of the sixth embodiment of this invention;

FIG. 14 is a flow chart illustrating the process for identifying a desired formatted document form according to the sixth embodiment of this invention;

FIG. 16 shows the formatted document library;

FIG. 19 shows the structure of a file which stores formatted document forms grouped in accordance with object fields;

FIG. 22 shows the relation library;

FIGS. 30, 32 and 44 show example of editing a work sheet form;

FIG. 41 shows an example of starting a process;

FIG. 43 shows an example of a graphics information table;

FIG. 46 shows an example of document definition information.

DESCRIPTION OF THE PREFERRED EMBODIMENTS

Preferred embodiments of this invention will be described in detail with reference to the accompanying drawings.

Embodiment 1

Figure 1:
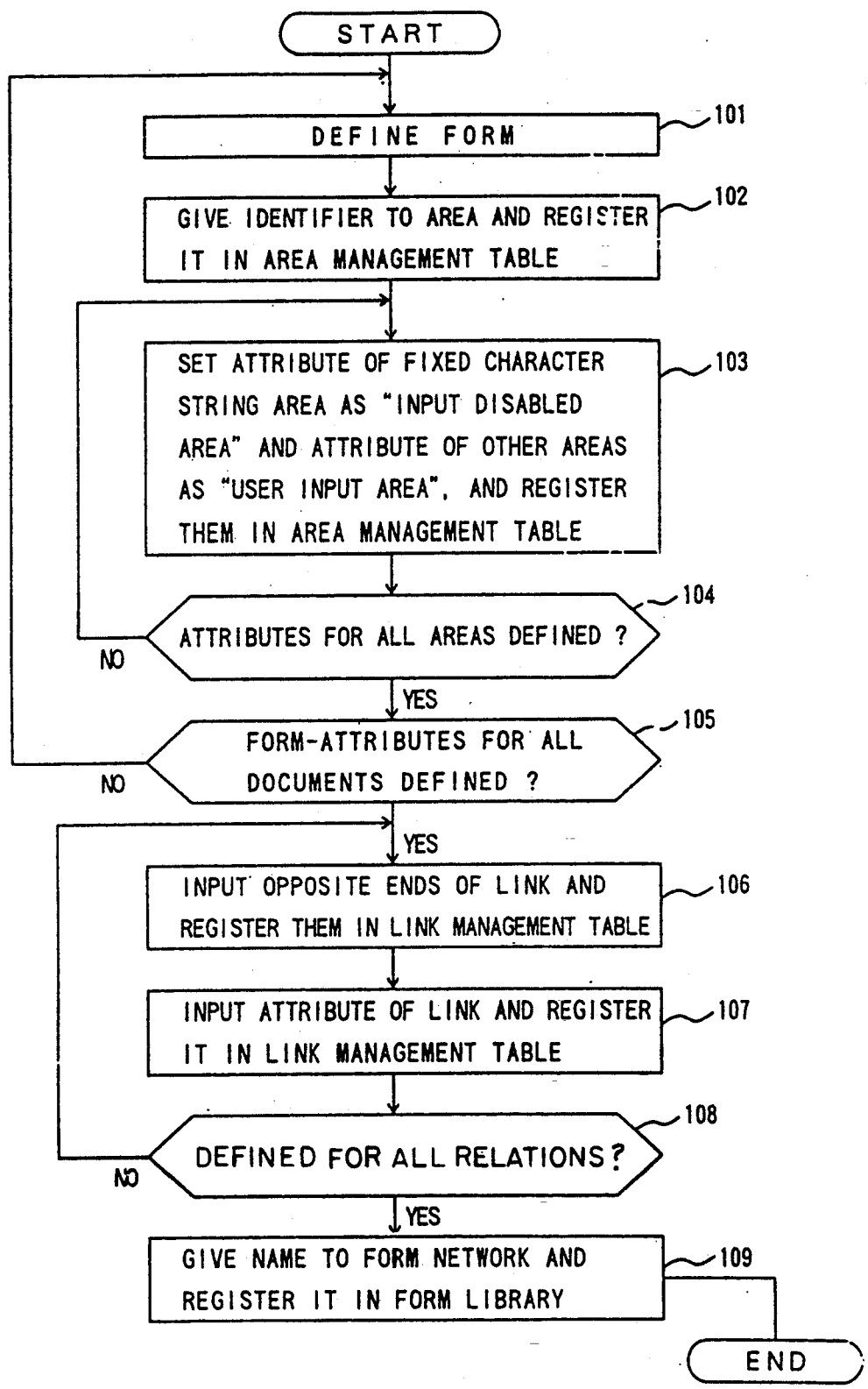
FIG. 1 is a flow chart illustrating an example of the procedure for registering the relation between document formats and between documents according to a first embodiment of this invention.
Figure 2:
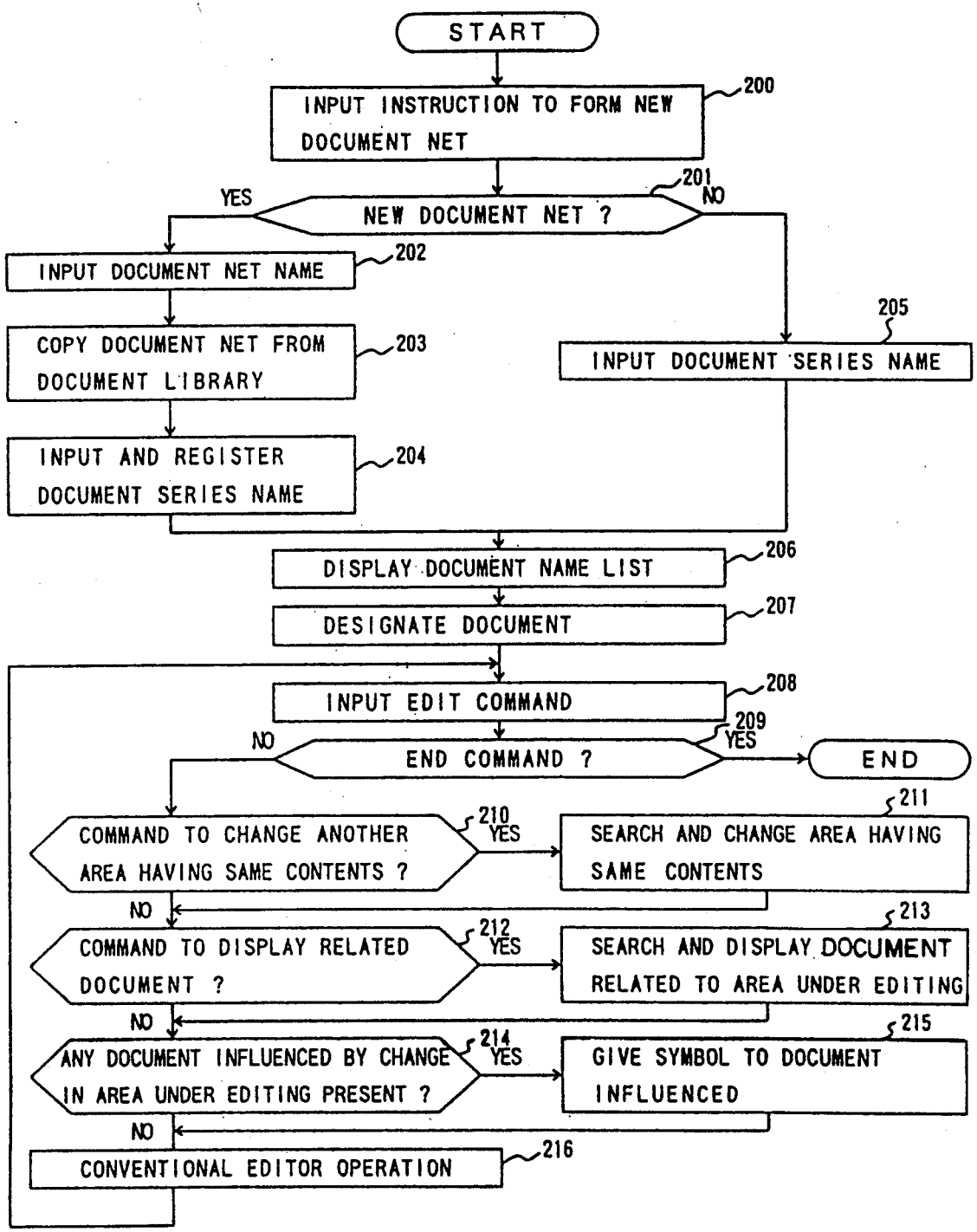
FIG. 2 is a flow chart illustrating an example of the procedure for making and editing a formatted document according to the first embodiment of this invention.
Figure 3:
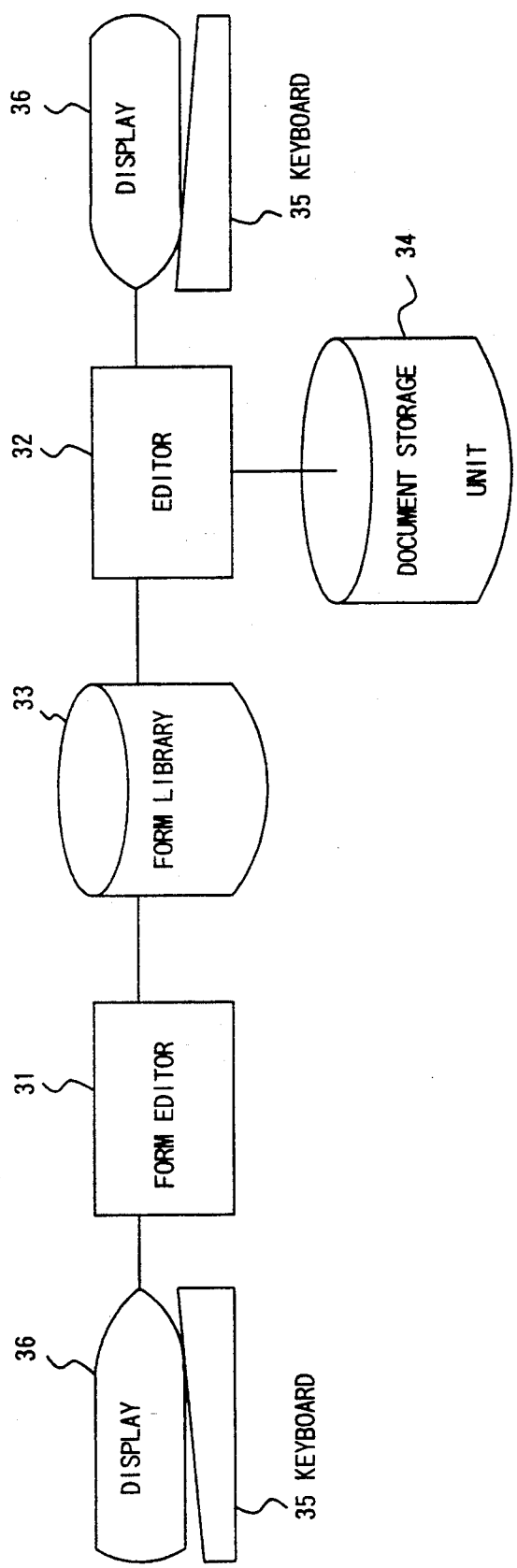
FIG. 3 shows a system arrangement of a formatted document making system according to an embodiment of this invention.

FIG. 1 is a flow chart showing an embodiment of the procedure for registering in a computer, relations between document forms and between documents or between areas or fields of documents (the related forms are called a "form net" hereinafter), and FIG. 2 is a flow chart showing an embodiment of the procedure for making/editing a formatted document by using the form net. FIG. 3 shows an example of the system arrangement of a formatted document making system which supports editing, and FIGS. 4A and 4B show an embodiment of a method of managing formats and a form net.

In FIG. 3, reference numeral 31 represents a form editor for making/editing a form net, 32 an editor for making/editing a formatted document, 33 a form library for storing the form net, 34 a document storage unit for storing a document made by the editor 32, 35 a keyboard, and 36 a display unit.

Figure 4A:
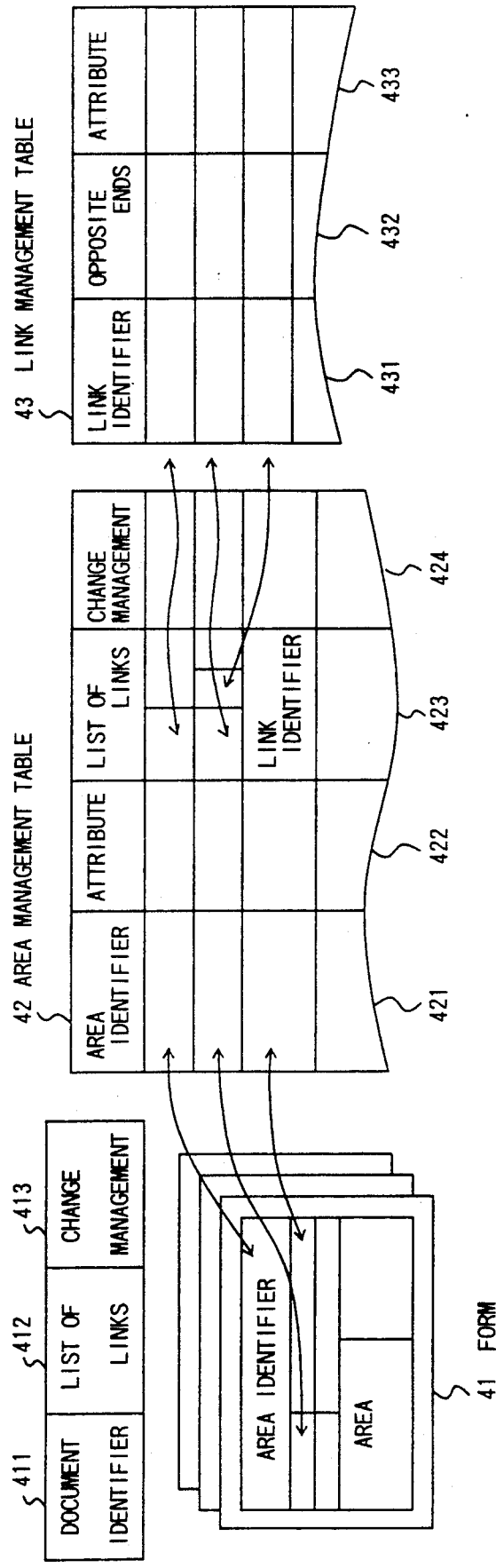
FIGS. 4A and 4B show an embodiment of managing a form and a form net.
Figure 4B:
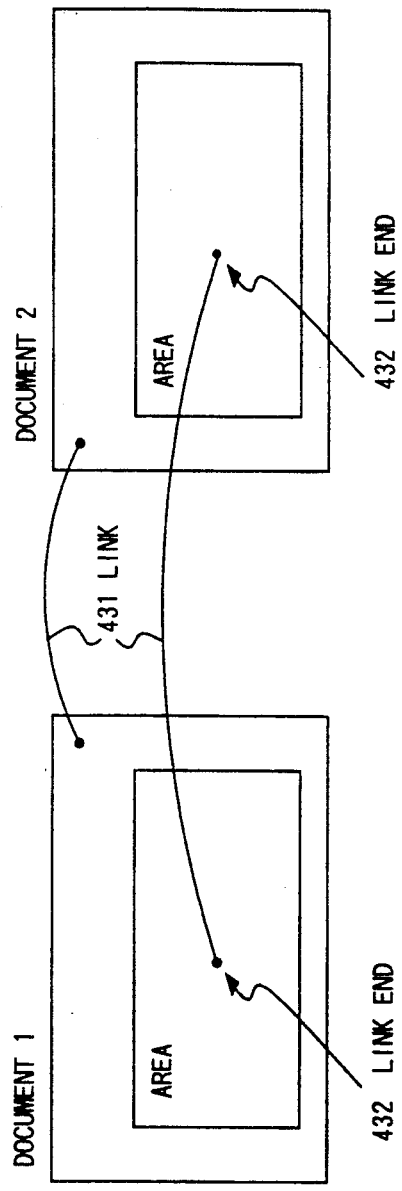

In this embodiment, the form net is managed by using a form 41, an area management table 42, and a link management table 43 shown in FIG. 4A. Referring to FIG. 4A, the form 41 includes a character string (hereinafter called a fixed character string) such as an item name which is not changed within the document, a layout of areas or fields into which a user of the editor 32 enters information, a document identifier 411 which is a name for identifying the document, a list 412 of links indicating the relation to other documents, and information 413 for managing the influence by a change in another document.

The area management table 42 for managing the attributes of areas of the document and the relation between areas, includes an area identifier 421 for identifying an area, an attribute 422 which indicates if a user of the editor 32 can enter information in the area, a list 423 of links indicating the relation to other areas, and information 424 for managing the influence by a change in another area. The link management table 43 includes a link identifier 431 for identifying a link, link opposite ends 432, and an attribute 433. The link opposite ends 432 are a pair of opposite ends of a link between document identifiers 411 or area identifiers 421. The attribute 433 indicates the type of link. In this embodiment, there are three types of links. The first type is a "link for indicating the areas in which the same identifier, i.e., the same contents or character string, is entered" (link 431 shown in FIG. 4B). The second type is a "link for indicating a document which is frequently called". The third type is a "link for indicating the area which is influenced by a change". The form 41 and area management table 42 are related to each other by the area identifier 421, whereas the area management table 42 and link management table 43 are related to each other by the link identifier 431.

The procedure of registering a form net will be described with reference to FIGS. 1, 3, 4A and 4B.

A form 41 is first defined by using the form editor 31 (step 101). An area identifier 411 is given to each area of the form and registered in the area management table 42 (step 102). The attribute 422 for the fixed character string area is set as "input disabled area" and the attributes 422 for other areas are set as "user input area", and the set attributes are registered in the area management table 42 (step 103). The step 103 is repeated until the attributes 422 of all areas are defined (step 104). The steps 101 to 104 are repeated until the forms 41 of all documents are defined (step 105). Next, both opposite ends 432 of a link are entered and registered in the link management table 43 (step 106). The attribute 433 of the link is entered and registered in the link management table 43 (step 107). The steps 106 and 107 are repeated until all relations are defined (step 108). Lastly, a name is given to the form net and stored in the form library 33 (step 109) to terminate the registration procedure.

Next, the procedure for making/editing a document by the editor 32 will be described with reference to FIGS. 2, 3 and 4A and 4B. The editor 32 has not only editing commands as conventional, but also has a command to change areas having the same identifier at the same time, a command to call and display related documents without designating the document names, and a command to store an area influenced by a change or a statement of such influence together with the influenced area or the form including the influenced area.

First, there is inputted an instruction to newly generate a document net or an instruction to edit an already generated document net (step 200). If a document net is newly generated (step 201), the form net name is inputted (step 202). The inputted form net is copied from the form library 33 to the document storage unit 34 (step 203). The name of the copied form net (hereinafter called a document series) is entered and registered in the document storage unit 34 (step 204). If a document net is not newly generated at step 201, a document series name is inputted (step 205). Next, a list of document names of the document series is displayed (step 206). A document to be edited is inputted (step 207). An edit command is inputted (step 208). If the inputted command is an end command (step 209), the procedure is terminated. Next, if there is entered a command to change another area having the same contents (step 210), the other area having the same contents and to be changed by the command is searched from the link management table 43 to automatically change the searched area and the area in concern at the same time (step 211). Next, if there is entered a command to display related documents (step 212), the documents related to the area under editing are searched from the area management table 42 and link management table 43, and the searched documents are displayed on another window (step 213). Next, if a change of the area under editing influences another area (step 214), the area or document to be influenced is searched from the area management table 42 and link management table 43, a symbol indicating that a change is requested and a reason of the change are entered in the searched document or area, and the symbol and reason together with the time at which the change is made are registered in the change management column 413 or 424 (step 215). If a change does not influence another area, editing a document is executed in a conventional manner (step 216).

According to this embodiment, if an area is changed, another area which should have the same contents is automatically changed, thereby avoiding mismatching between documents or between areas. Furthermore, related documents can be called without entering the document names. Furthermore, if there is a change, a symbol is automatically given to the area to be influenced, and so there is no possibility of leaving it unchanged.

Embodiment 2

An embodiment of changing a form net will be described in detail with reference to FIGS. 5 and 6.

Figure 6:
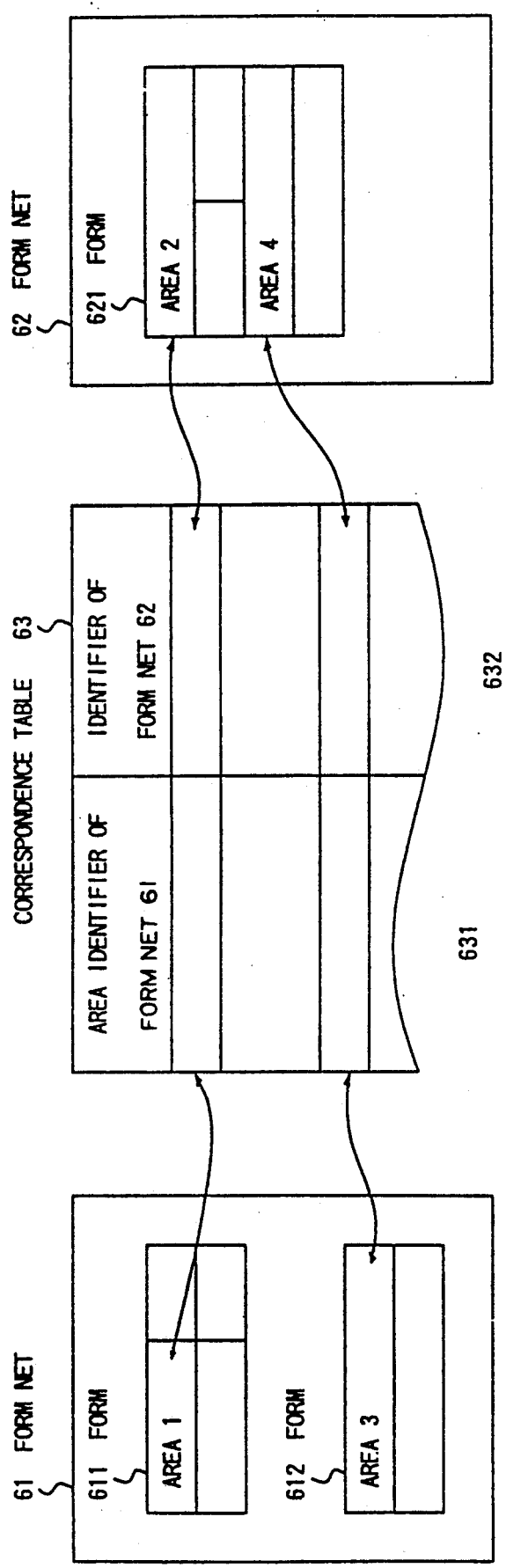
FIG. 6 is a correspondence table for storing the relation between form nets.

FIG. 5 is a flow chart illustrating the procedure of changing a form net, and FIG. 6 is a correspondence table storing a relation between form nets.

Referring to FIG. 6, reference numeral 61 represents a form net having document forms 611 and 612. Reference numeral 62 represents another form net having a document form 621. A correspondence table 63 storing the relation between the form nets 61 and 62 is constructed of a set of a column for an area identifier 631 for the form net 61 and a column for an area identifier 632 for the form net 62.

The procedure of changing a form net will now be described with reference to FIGS. 5 and 6.

First, an area of a form within the form net 61 is designated (step 501). An area within the form net 62 associated with the area designated at step 501 is designated (step 502). The identifiers of the designated two areas are registered in the identifier area columns 631 and 632 of the correspondence table 63 (step 503). A link whose one end indicates the area designated at step 501 is copied onto the link management table of the form net 62 (step 504), and the one end is used for the area designated at step 502. The steps 501 to 504 are repeated until all relations are defined (step 505).

According to this embodiment, it is possible for an editor user to refer/update a document after changing the form thereof into a form the user frequently uses and is familiar with.

Embodiment 3

In the embodiment 1, the area attribute operates only to check "if an editor user is allowed to change the contents of the area at the time of editing". In this embodiment, there are provided three types of areas including "an area whose contents are allowed to be changed by an editor user at the time of document editing", "an area whose contents are determined at the time of form defining and not allowed to be changed at the time of document editing" and "an area whose contents are temporarily determined at the time of form defining and allowed to be changed at the time of document editing." The type of areas is registered in the attribute 422. The default attribute of an area can be defined at the time of form defining.

As the areas within a document, there may be provided two types of areas, one type being an area whose contents can be changed by a user, and the other being an area whose contents can be generated by a system. By registering such type in the attribute 422, it is not necessary for an editor user to input information such as a date in the area generated by the system, thereby improving the operation of the editor.

The procedure of defining a form net in this embodiment can be executed in accordance with the flow chart shown in FIG. 1 by changing the step 101 to "the attributes of areas are inputted and registered in the area management table at the same time when a form is defined" and deleting the step 103.

Figure 7:
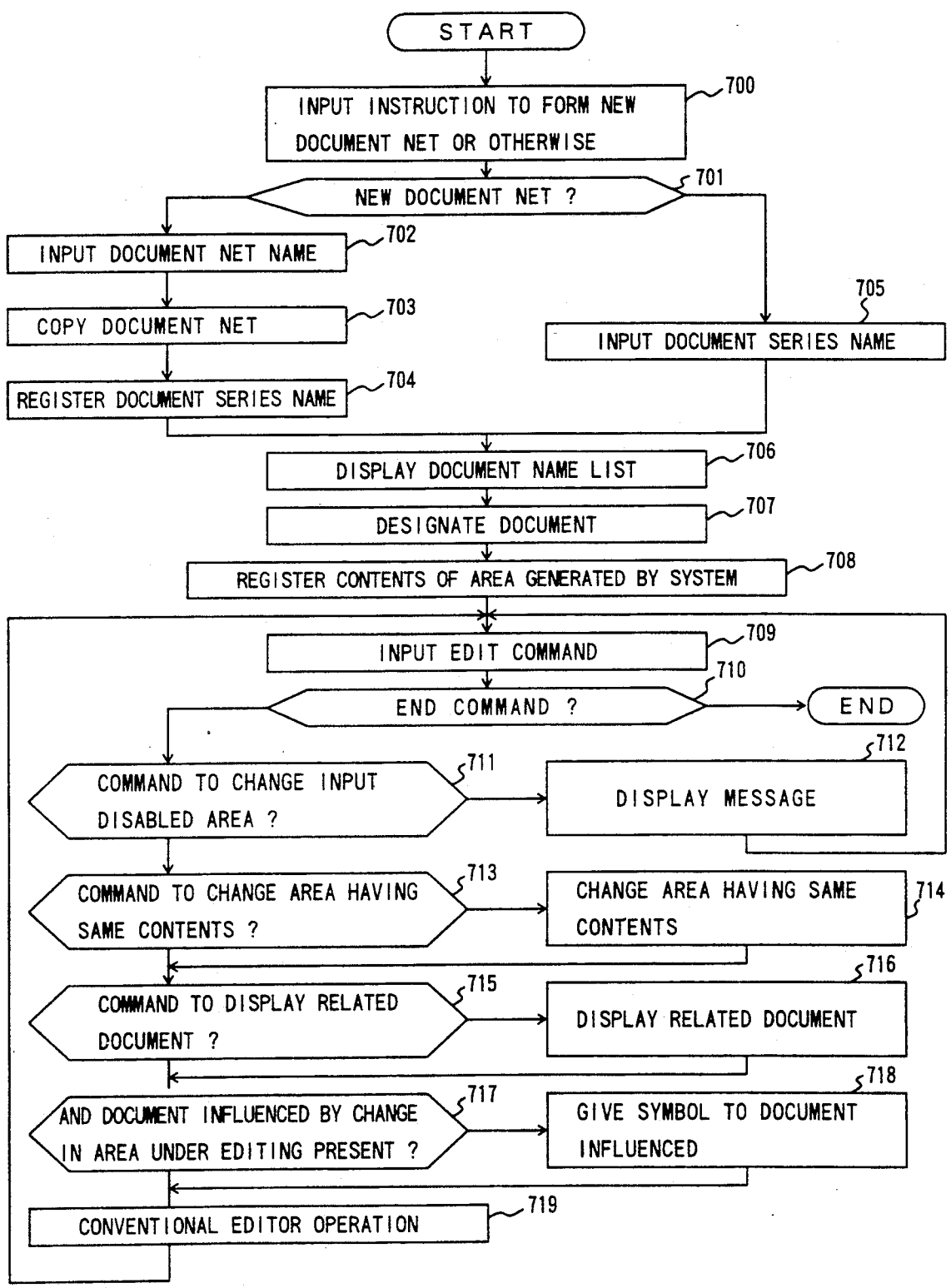
FIG. 7 is a flow chart illustrating an example of the procedure for making and editing a formatted document according to a third embodiment of this invention.

An example of the editing procedure of this embodiment will be described with reference to the flow chart shown in FIG. 7.

The flow from steps 700 to 707 is the same as the steps 200 to 207 shown in FIG. 2. Thereafter, the contents of areas generated by the system are registered (step 708). A command is entered (step 709). If an end command is entered (step 710), the procedure is terminated. If not at step 710 and a command is entered which instructs to edit an area whose contents is determined at the time of form defining and not allowed to be changed at the time of document editing (step 711), then a message indicative of a disabled state of editing is displayed and thereafter the control returns to step 709 (step 712). If not at step 711, the steps 713 to 719 are executed which are the same as those from the steps 210 to 216 shown in FIG. 2.

Embodiment 4

Figure 8:
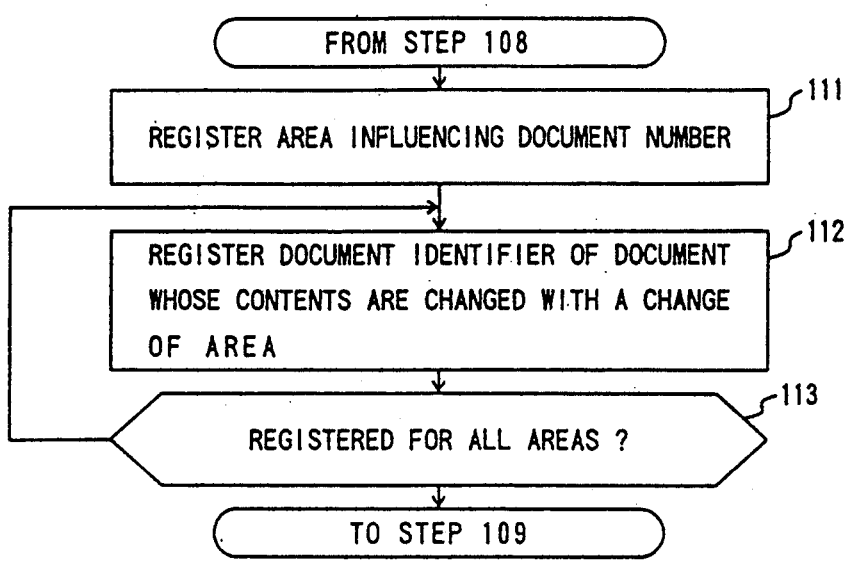
FIG. 8 is a flow chart showing an example of the procedure for registering the relation between document forms and between documents for the case where the number of documents in a document series dynamically changes during making and editing a document, according to a fourth embodiment of this invention.
Figure 9:
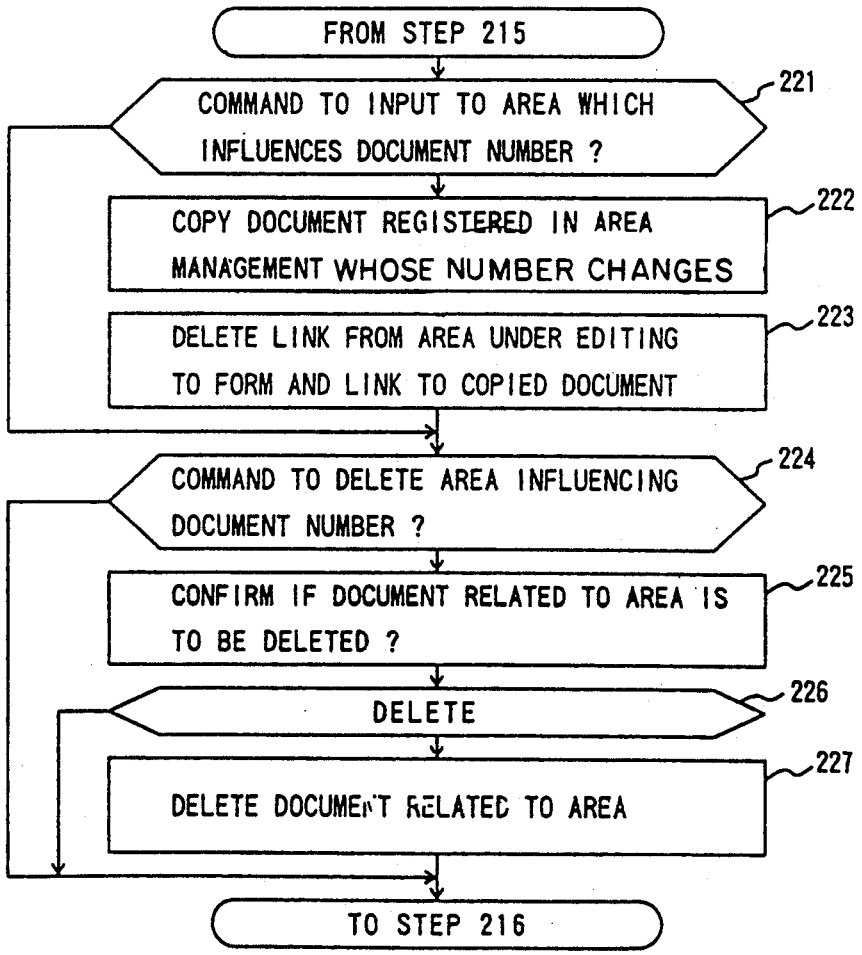
FIG. 9 is a flow chart showing an example of the procedure for making and editing a formatted document according to the fourth embodiment of this invention.

FIG. 8 is a flow chart illustrating the procedure of defining a form net, and FIG. 9 is a flow chart illustrating an example of the procedure of making/editing a document by using the defined form net. FIG. 10 shows an embodiment of the method of managing those documents whose number changes dynamically.

Referring to FIG. 10, reference numeral 11 represents an area management table used for dealing with documents whose number changes dynamically, 12 a part of a form net, and a part of a document series 13 generated by using the form net 12. Similar to the area management table 42 shown in FIG. 4, this area management table 11 includes an area identifier 421, an attribute 422, a list 423 of links, and a change management 424, and in addition a flag 425 indicating if the area in concern influences the number of documents or not, and a list 426 of document identifiers.

Next, the procedure of defining a form net will be described with reference to FIGS. 8 and 10.

This procedure is a combination of the procedure shown in FIG. 1 and the procedure of registering an area which influences the number of documents, and the influenced documents. Specifically, the steps 101 to 108 shown in FIG. 1 are first executed, and the area which influences the number of documents is registered in a change management 425 of the area management table 11 (step 111). A list of identifiers of documents whose contents are changed with a change of an area, is registered in a document list 426 of the area management table 11 (step 112, in the example shown in FIG. 10, the forms 122 and 123 are registered). The step 112 is repeated until all areas which influence the number of documents are processed (step 113) and thereafter, the step 109 shown in FIG. 1 is executed to terminate the procedure.

Next, the procedure of making/editing a document by using a defined form net will be described with reference to FIGS. 9 and 10.

This procedure is a combination of the procedure shown in FIG. 2 and the procedure by a command to update the area which influences the number of documents. Specifically, the steps 200 to 215 shown in FIG. 2 are first executed, and if a command input at the step 208 is for an area which influences the number of documents (step 221), the list 426 of documents of the area management table 11 is copied (step 222). The link from the area under editing to the form in concern is deleted and thereafter, the copied documents are linked (step 223, in the example shown in FIG. 10, a link to the form 132 is changed to the documents 134 and 136). Next, if the command inputted at step 208 is a command to delete the area which influences the number of documents (step 224), an instruction is entered which indicates to delete the linked documents (in the example shown in FIG. 10, documents 134 to 137) or not (step 225). If the documents are to be deleted (step 226), the documents linked to the area in concern are deleted (step 227) and thereafter the step 216 shown in FIG. 2 is executed.

According to this embodiment, forms and links are not required to be copied at the time of document editing for the case where the content of an area is edited which influences the number of documents dynamically.

Embodiment 5

FIG. 11 shows an example of the system arrangement of an electronic mail system for circulating mail, and FIG. 12 is an example of the form of a circular document.

In FIG. 11, a communication network 81 may be a local area network or the like. Connected to the communication network 81 are a plurality of mail terminals 82-1 to 82-n each terminal having one or more transmitters/receivers 83-1 to 83-m ($n \leq m$). A circular mail made at a certain mail terminal circulates mail terminals having designated transmitters/receivers in the designated order.

In FIG. 12, the form 90 of a circular document is constructed of circular document destination columns 91-1 to 91-l ($1 \leq m$), and a circular document column 92. In each circular document destination column 91-1 to 91-l, a receiver name is registered and a symbol representative of that the receiver received the circular document can be added thereto.

A transmitter copies the form 90 of a circular document, inputs the circular document contents in the circular document column, and transmits it to the first receiver. The receiver adds the symbol when the circular document is received. Transmission of the circular document to the next receiver is automatically carried out by the mail system itself.

Making the form of a circular document and editing a circular document are executed by the methods described with the embodiments 1 to 4.

According to this embodiment, a transmitter is not required to designate circular document designations.

Embodiment 6

In this embodiment, there will be described mainly the method of managing a document to be described when developing software. FIG. 13 is a block diagram showing the system arrangement of this invention. A formatted document form identification/discrimination information defining unit 1301 receives, in an interactive manner with a user, the discrimination information for identifying a formatted document form, i.e., work sheet form, used when developing software. A formatted document form library 1302 stores a plural group of formatted document forms. A correspondence table 1303 is a table for defining the relation between forms of formatted documents such as specifications to be described when developing software, and system types. In accordance with the correspondence table, a formatted document form identifying unit 1304 identifies a form group of formatted documents corresponding to the system type to be developed and inputted by a user, and derives the identified form group from the formatted form library. A work sheet form storage unit 1305 accumulates the identified form group derived by the formatted document identifying unit 1304. A work sheet form editing unit 1307 edits stored work sheet forms 1306 to thereby customize them as desired by a user.

Figure 15:
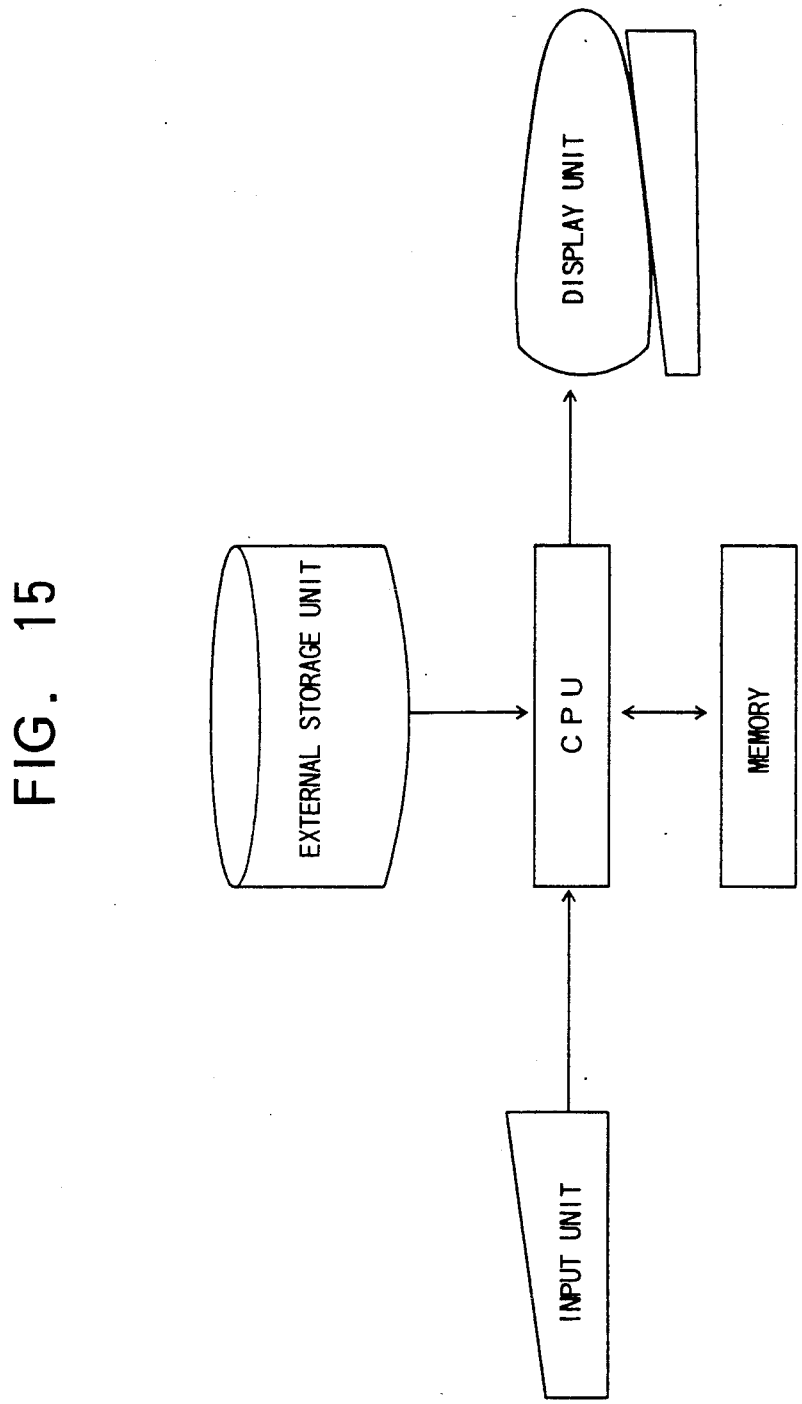
FIG. 15 shows the hardware arrangement.
Figure 17:
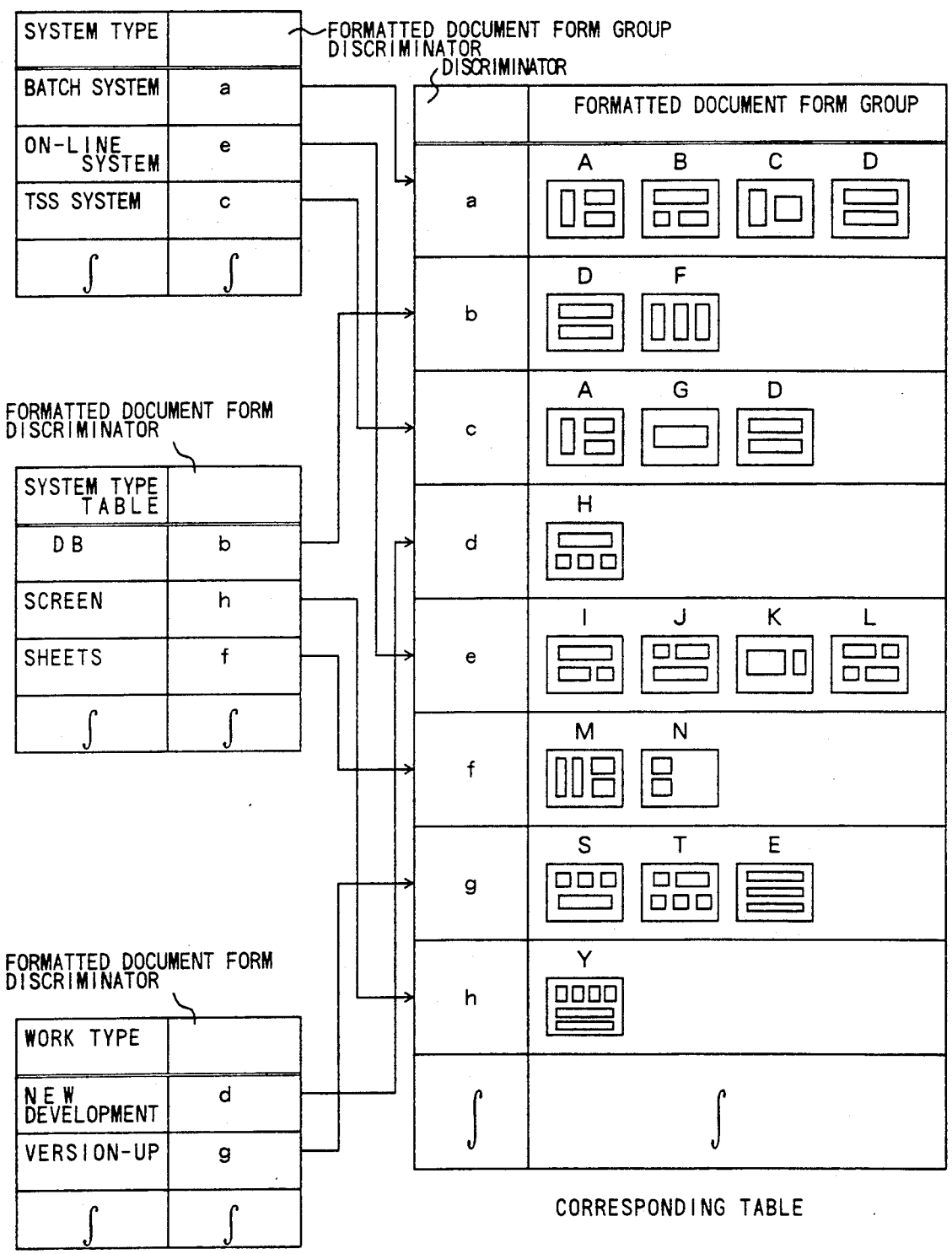
FIG. 17 shows the structure of the correspondence table.

FIG. 14 is a flow chart illustrating the procedure to be executed by the formatted document form identification/discrimination information defining unit 1301 and formatted document form identifying unit 1304, and FIG. 15 shows the hardware structure. FIG. 16 shows an example of the contents of the formatted document form library. In FIG. 16, the name of a formatted document form is entered in a "formatted document form" column, and the name of an area constituting a formatted document form is entered in a "form constituting area" column. For example, a form "file list" is constructed of areas such as a "file name" and "constituent item". FIG. 17 shows system type tables and a correspondence table. The system type table is constructed of discriminators each unanimously discriminating a system type to be developed and a corresponding formatted document form group. The correspondence table is constructed of discriminators and corresponding formatted document form groups. With reference to the flow chart shown in FIG. 14, there will be described the procedure for identifying a formatted document form group which matches a particular system. In this embodiment, in the formatted document form identification/discrimination information defining procedure, as the form identification/discrimination information, there are inputted a type of system such as a batch system and an on-line system, and a type of development such as development of system input/output medium including data base (DB), graphics, and the like, new development, development of version-up and the like (step 1401). In accordance with the inputted system type, a discriminator for unanimously discriminating a corresponding formatted document form group is obtained from the system type tables shown in FIG. 17 (step 1402). A formatted document form group corresponding to the discriminator is obtained from the correspondence table (step 1403). If formatted document forms for all discriminators are obtained (step 1404), an OR operation between the obtained formatted document form groups is executed (step 1405). The formatted document form groups are stored in a table shown in FIG. 18A (step 1406). For example, assuming that a "batch system" is designated as the system type, and a data base "DB" is designated as the input medium, the formatted document form groups "A", "B", "C", "D", and "F" are obtained from the correspondence table. An OR operation of the obtained groups results in a set of formatted document form groups "A", "B", "C", "D", and "F". This means that the formatted document form groups "A", "B", "C", "D", and "F" are described for the development of a batch system by using a data base DB. If the correspondence table is not used, the correspondence between the system type to be developed and a corresponding formatted document form may be stored in the formatted document form identifying unit 1304.

The correspondence table shown in FIG. 17 may use a standard type correspondence table, or may be made as in the following. Discrimination information for identifying a formatted document form is entered and the identified document from within the formatted document form library 1302 is stored. Next, there is formed a correspondence between the inputted discrimination information and the formatted document form (work sheet) identified by the discrimination information. The correspondence is stored in a correspondence table as the information of correspondence between the discrimination information and formatted document forms.

Figure 18:
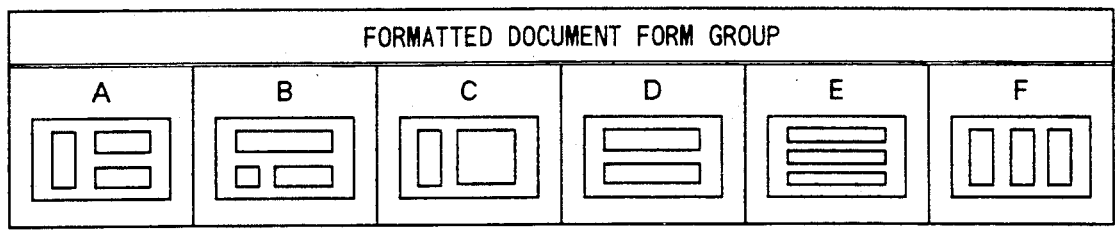
FIGS. 18A and 18B show the structure of formatted document form groups.
Figure 18:
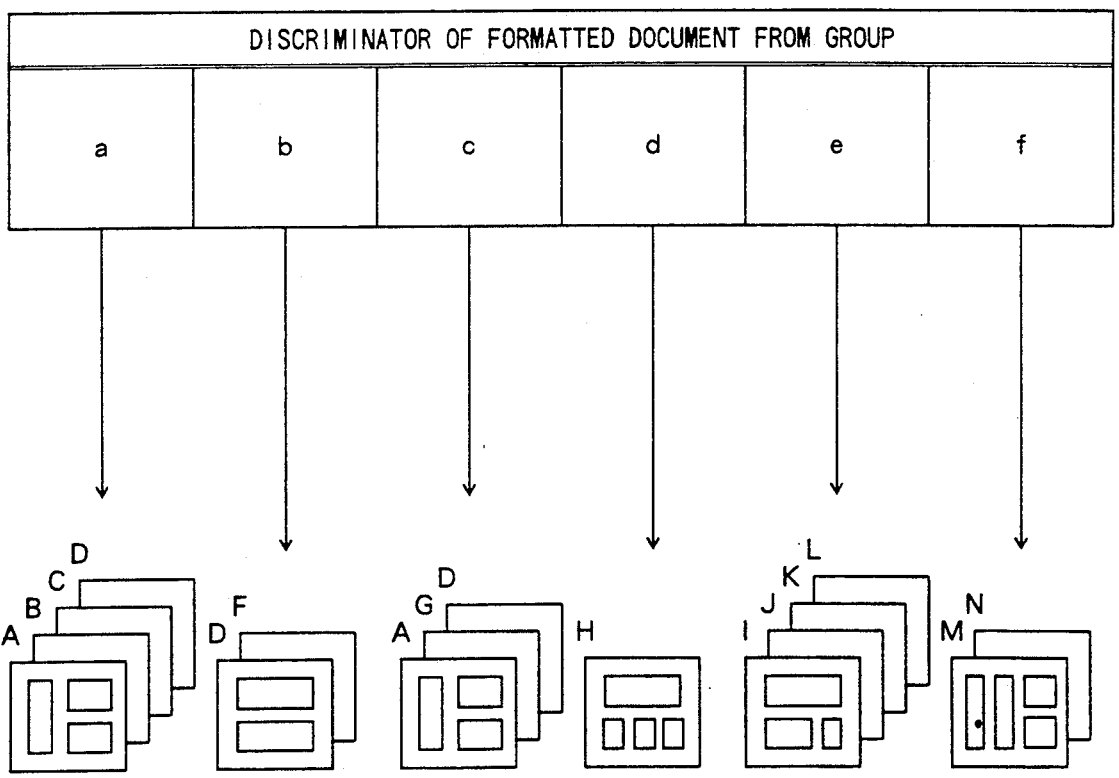

In the above-described embodiments, the forms per se of a set of derived formatted document form groups are stored as shown in FIG. 18A. Since the forms per se are stored, it requires a large amount of memory capacity in some cases. To deal with such a problem, there will be described a method of storing the system type to be developed instead of storing the formatted document forms per se. In the flow chart shown in FIG. 14, the type of a system to be developed, inputted and defined by a user at the step 1401 is stored in a table shown in FIG. 18B. This table shown in FIG. 18B does not store a set of formatted document form groups corresponding to system types, but stores only the correspondence between system types and their formatted document forms. At the time of describing specification information and the like, the formatted document form groups corresponding to the system type to be developed, defined by a user, are derived from the correspondence table and system type tables shown in FIG. 17, while referring to the table shown in FIG. 18B, and the derived form groups are subjected to an OR operation to thereby sequentially provide a set of formatted document forms corresponding to the system type to be developed. In the above procedure, only the system type to be developed is stored so that the problem of large memory capacity can be solved.

As an alternative method of deriving a particular formatted document from group form the formatted document form library, there is a method of accumulating beforehand form groups on the system field unit basis and designating a system field to be developed in order to derive a formatted document form group. FIG. 19 shows an object-field-based formatted document form library which stores formatted document form groups defined on the system field unit basis. With this method, it is not necessary for a user to input the system type to be developed. Furthermore, even if the system field to be developed is not registered in the formatted document form library, a system field similar to the system field in concern may be designated to thereby identify a formatted document form group suitable to some degree.

Figure 20:
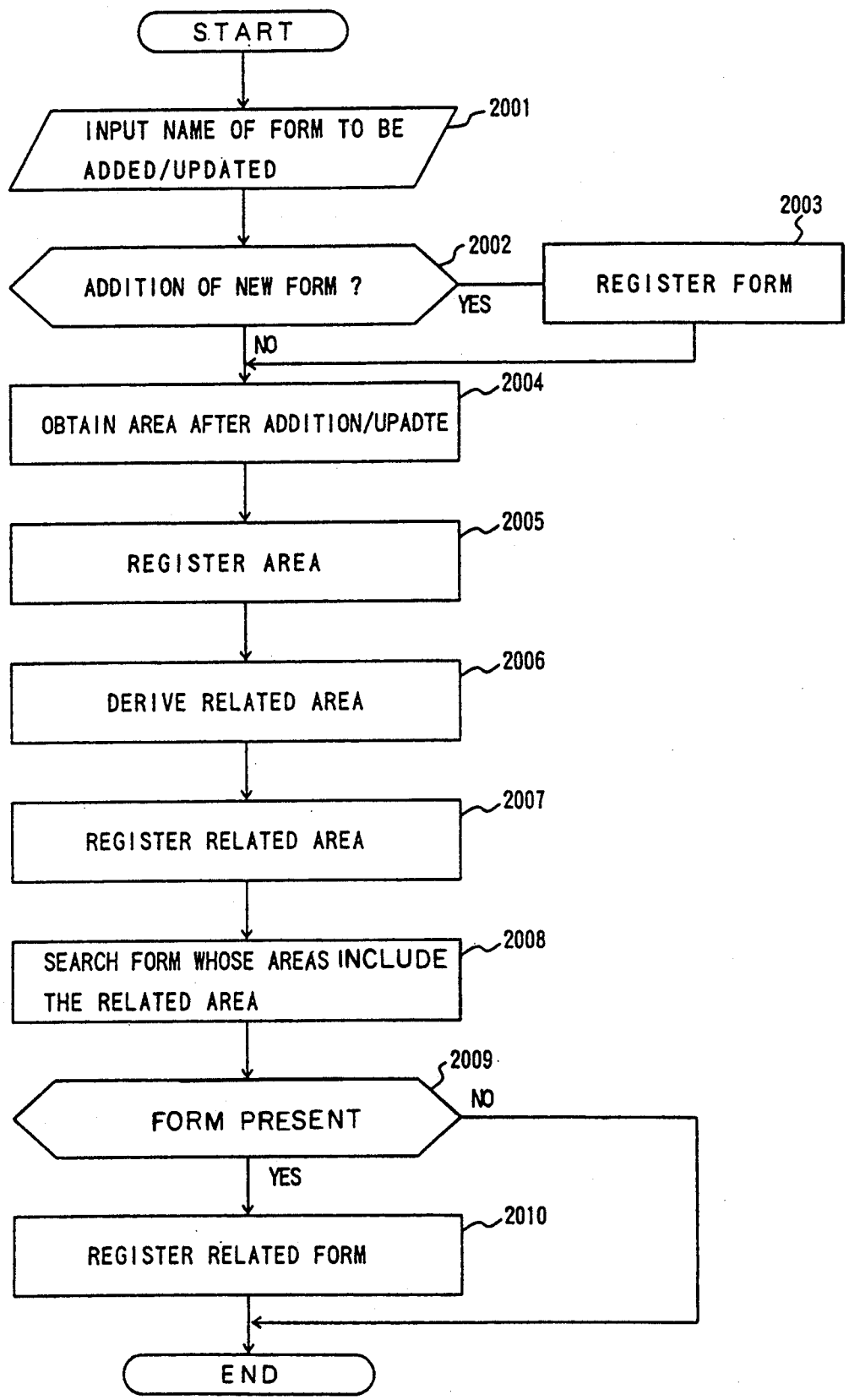
FIG. 20 is a flow chart illustrating the customizing procedure according to the sixth embodiment of this invention.

Next, there will be described in detail an embodiment of the work sheet form editing unit 1307 shown in the block diagram of FIG. 13, with reference to the flow chart shown in FIG. 20. A relation library and an inter-area relation library shown in FIGS. 22 and 23 store the relation between forms and between areas constituting a form, respectively. The detailed description therefor will be given later. First, there are inputted the name of a work sheet form to be edited (added, updated and so on) (step 2001). It is checked if the inputted form name is already present (step 2002). If not present, i.e., if a new form is to be generated, the form name is registered in the relation library shown in FIG. 22 and in the formatted document form library shown in FIG. 16 (step 2003). Next, an area constituting the inputted and edited form is obtained (step 2004). In the case of updating, the area constituting a form before updating is replaced with the area constituting a form after updating, within the formatted document form library shown in FIG. 16. In the case of adding, an area constituting an updated form is added (step 2005). An area related to the added or updated area is derived from the inter-area relation library (step 2006). The derived area is registered (step 2007). A form constituted by the registered, related area is searched from the work sheet form library (step 2008). If the form is present (step 2009), the form is registered as the related form in the inter-form relation library (step 2010). In the above procedure, the newly defined work sheet forms and areas constituting a form are automatically related to the already defined form and area, while editing (adding, updating and the like) a work sheet form customized as a user desires. Therefore, it is not necessary for a user to designate a relation of a defined work sheet form relative to the already defined work sheet forms and areas.

Figure 21:
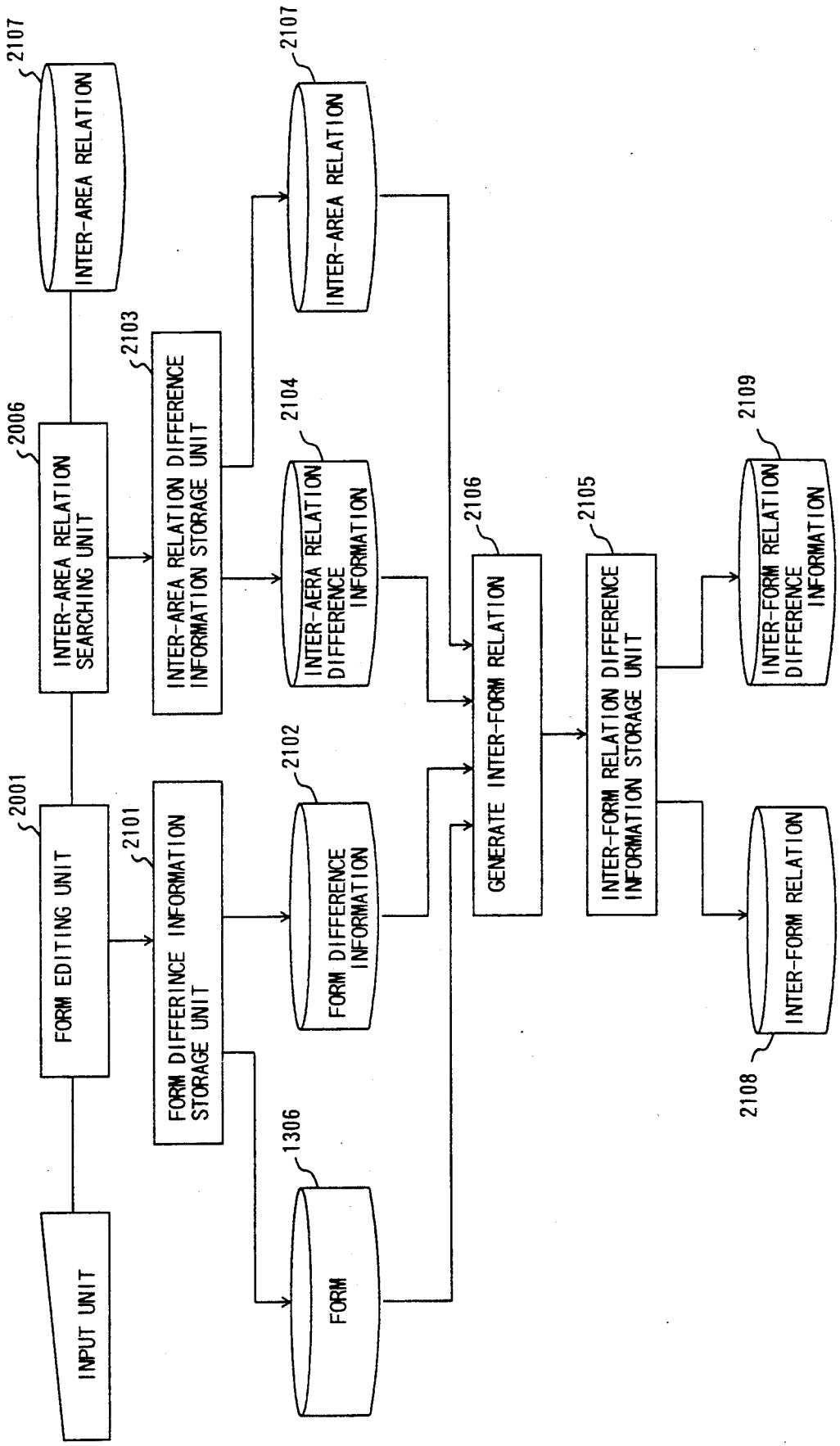
FIG. 21 is a functional block diagram illustrating a method of storing difference information.

Next, there will be described a method of storing as difference information a newly edited (added, updated, and the like), defined work sheet form, areas constituting the form, and the relation therebetween. FIG. 21 is a block diagram embodying the method. A newly defined work sheet form or area edited by a user is stored in a difference information storage unit 2101 as the difference information. The information of a work sheet form having the difference information is stored as in the work sheet form 1306. Similarly, an inter-area relation difference information storage unit 2103 causes an inter-area relation generated upon definition of a work sheet form to be stored as an inter-area relation difference information 2104. A relation between work sheet forms is generated in accordance with the form 1306, form difference information 2102, inter-area relation difference information 2104, and inter-area relation 2107 stored in a table (step 2106). The obtained inter-form relation is stored as the difference information via an inter-form relation difference information storage unit 2105 into an inter-form relation 2108 and an inter-form relation difference information 2109. Reference numeral 2170 denotes a table for storing the inter-area relations. In the above manner, the inter-area and inter-form relation generated upon a new definition of a work sheet form is stored as the difference information, thereby reducing the capacity of a memory for storing such information.

Embodiment 7

Figure 24:
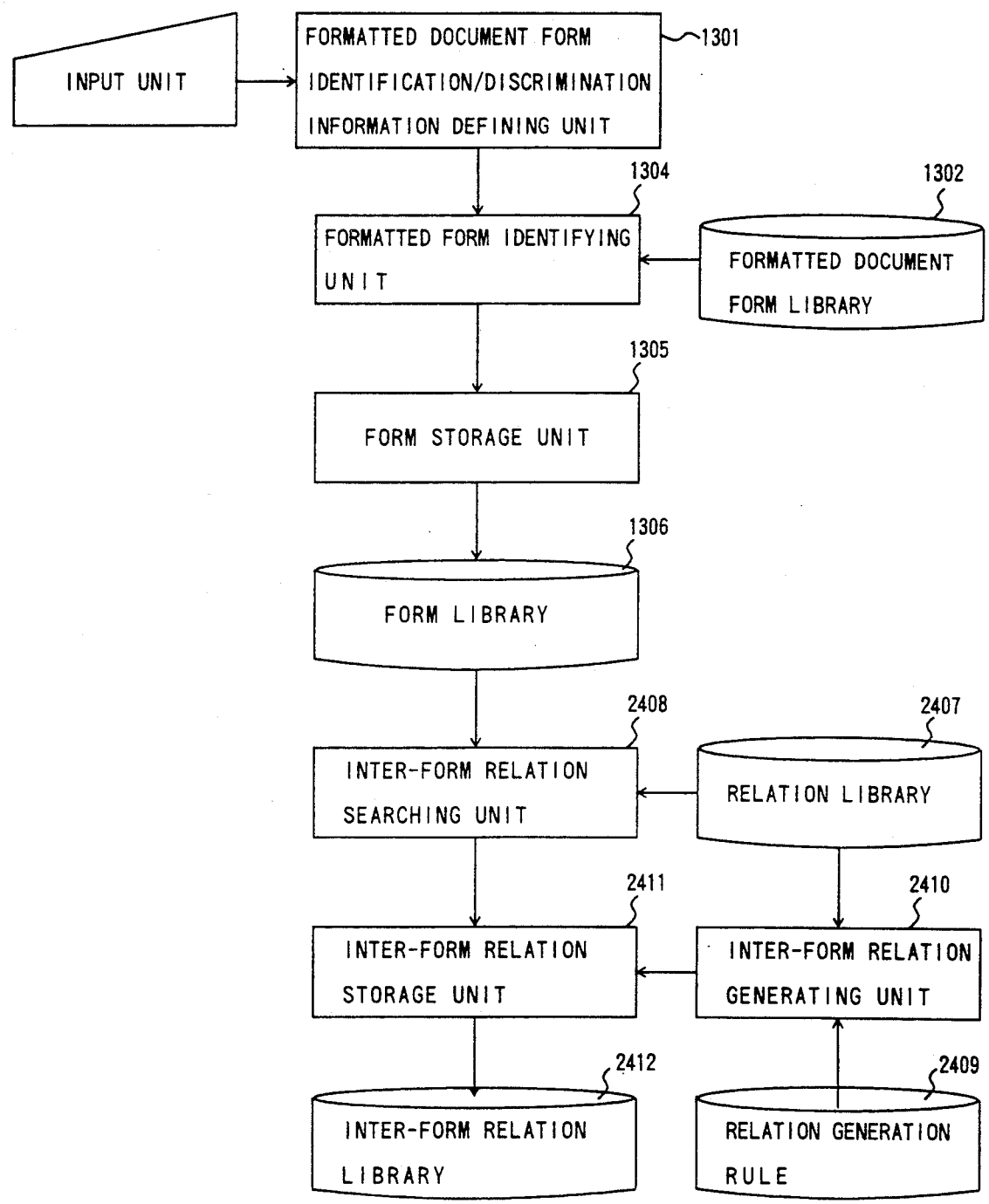
FIG. 24 is a functional block diagram according to the seventh embodiment of this invention.
Figure 25:
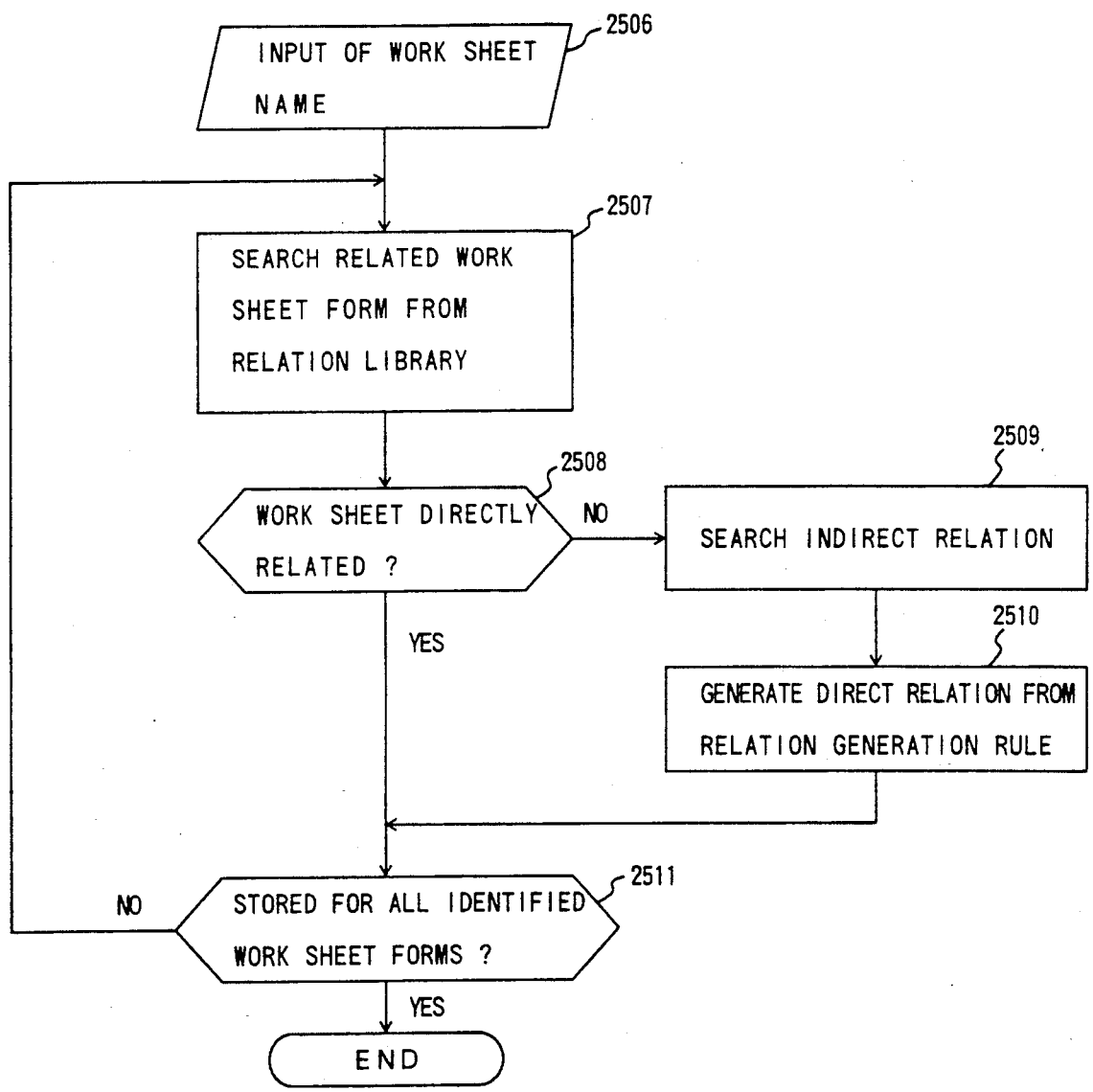
FIG. 25 is a flow chart of the seventh embodiment.
Figure 26:
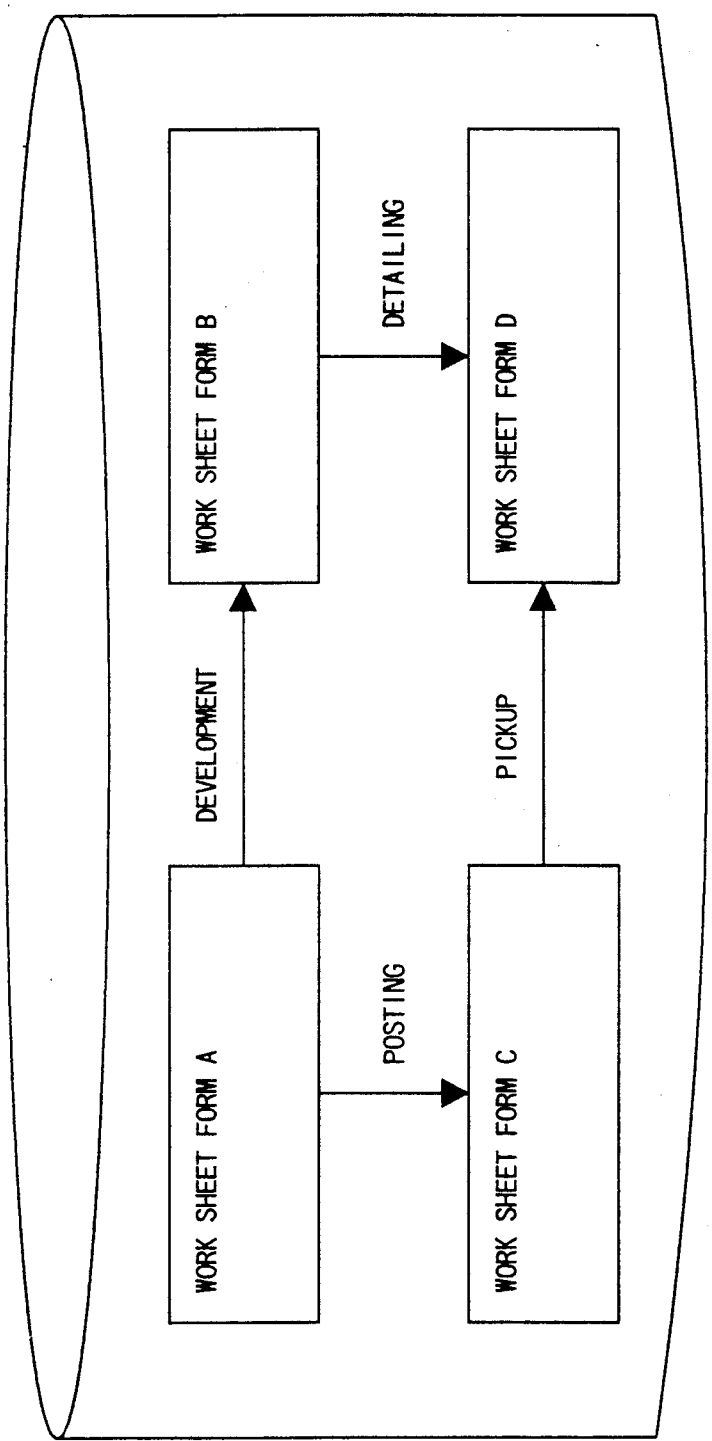
FIG. 26 shows an example of a relation generation rule.
Figure 27:
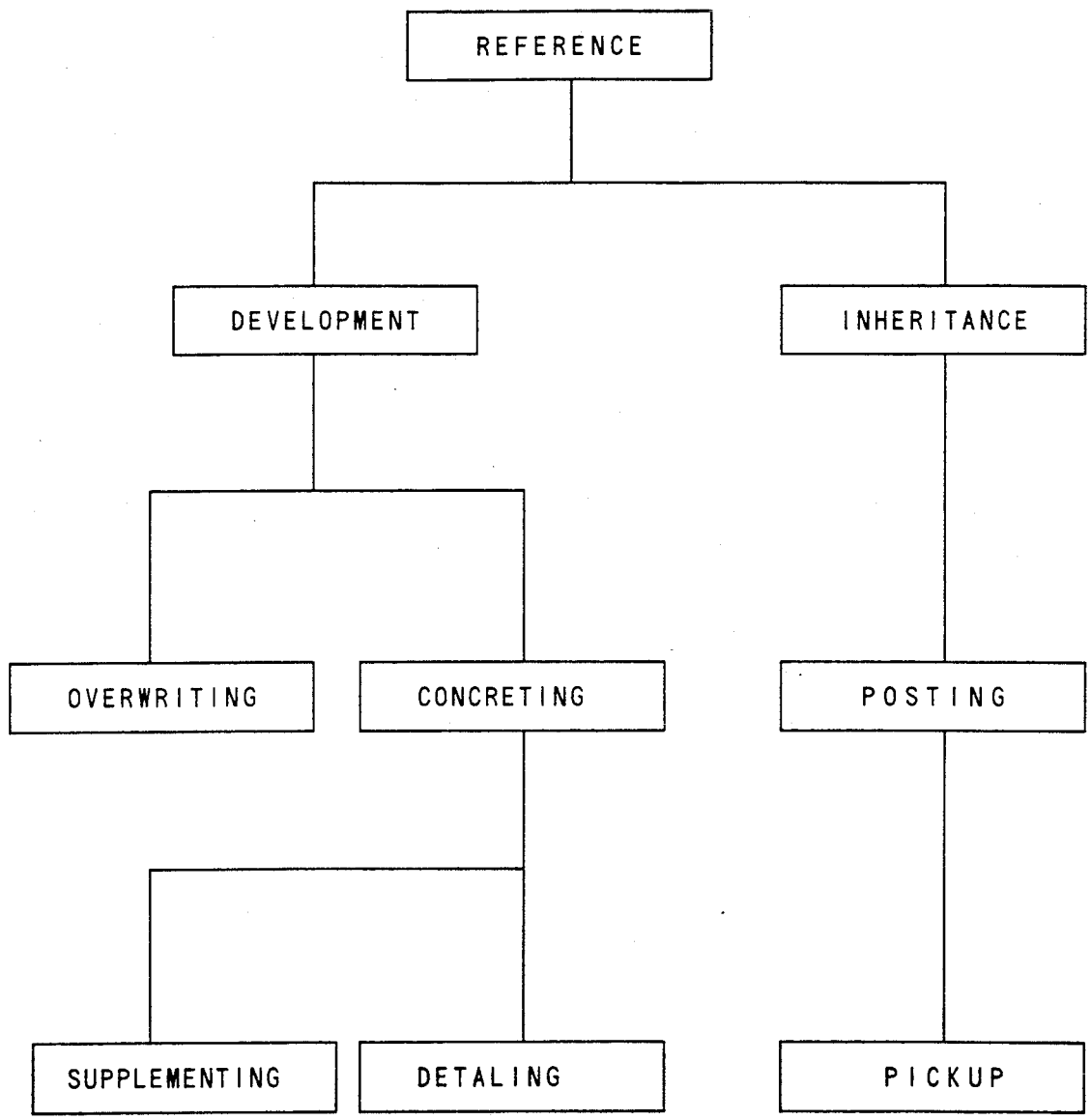
FIG. 27 illustrates an example of classification of relations between work sheet forms.

The detailed description will be given below, for an embodiment method of automatically generating a relation between forms and areas with respect to a particular formatted document form (work sheet). FIG. 24 is a block diagram showing the system arrangement associated with this embodiment method. A formatted document form identification/discrimination information defining unit 1301, formatted document form identifying unit 1304, and form storage unit 1305 have the same structure and function as described previously. An inter-form relation searching unit 2408 searches an inter-form relation in a form library 1306 from a relation library 2407. If the inter-form relation is already registered in the relation library, it is derived therefrom. The relation library 2407 registers therein the inter-form relations of the formatted documents stored in the formatted document library 1302. An inter-form relation generating unit 2410 generates an inter-form relation in accordance with a relation generating rule if the inter-form relation is not registered in the relation library 2407. An inter-form relation storage unit 2411 causes the inter-form relations obtained at the inter-form relation searching unit 2408 and inter-form relation generating unit 2410 to be stored in an inter-form relation library 2412. FIG. 22 shows the relation library which stores the inter-form relations of fixed document forms. There will be described the procedure for generating an inter-form relation with reference to the flow chart shown in FIG. 25. The name of a work sheet is inputted (step 2506). An inter-form relation with respect to a work sheet form stored in the form library 1304 is searched from the relation library shown in FIG. 22 (step 2507). It is checked if the inter-form relation is already registered in the relation library (step 2508). If not, a new inter-form relation is generated in accordance with an indirect relation and a relation generating rule 2409 (steps 2509 and 2510). A method of generating a new inter-form relation will be described in detail below. That inter-form relation is not registered in the relation library, means that there is present not a direct inter-form relation but an indirect inter-form relation. As shown in FIG. 26, an indirect relation is between a work sheet form "A" and a work sheet form "D" both being indirectly related to each other via a work sheet form "B". An indirect relation is searched from the relation library (step 2509). A direct relation is obtained in accordance with the searched indirect relation and a relation generating rule to be described later (step 2510). The following description is directed to a method of deriving a direct relation from an indirect relation. FIG. 27 shows a classification of an inter-form relation. A relation "reference" indicates a relation to a work sheet form to be referred to while it is being described. A relation "inheritance" indicates a relation between work sheet forms having direct information inheritance, and a relation "development" indicates a relation between work sheet forms not having direct information inheritance but having information described while developing it. The relation "development" also indicates that the lower the hierarchy, the weaker the relation. A generation rule is set in the following manner by using the relation classification shown in FIG. 27. Namely, "a parent relation having the structure common to two related work sheet forms is used as a new relation between them". For example, for the two relations "posting" and "concreting", the common parent relation becomes a relation "reference". For the two relations "posting" and "picking up", the common parent relation becomes a relation "inheritance". A detailed example of generating a new relation by using the above rule will be described with reference to FIG. 26. The work sheet form "A" and work sheet form "B" have a direct relation "posting". The work sheet form "C" and work sheet form "D" have a direct relation "picking up". Between the work sheet form "A" and work sheet form "D", there are relations "posting" and "picking up" via the work sheet form "C". The relations "posting" and "picking up" are integrated into a relation "inheritance" by using the above rule, so that there is generated a direct relation "inheritance" between the work sheet form "A" and work sheet form "D". The inter-form relation obtained at the steps 2507 and 2510 is stored in the inter-form relation library 2412. The above procedure is repeated until all work sheet forms stored in the form library at the step 2507 are completed (step 2511).

Figure 23:
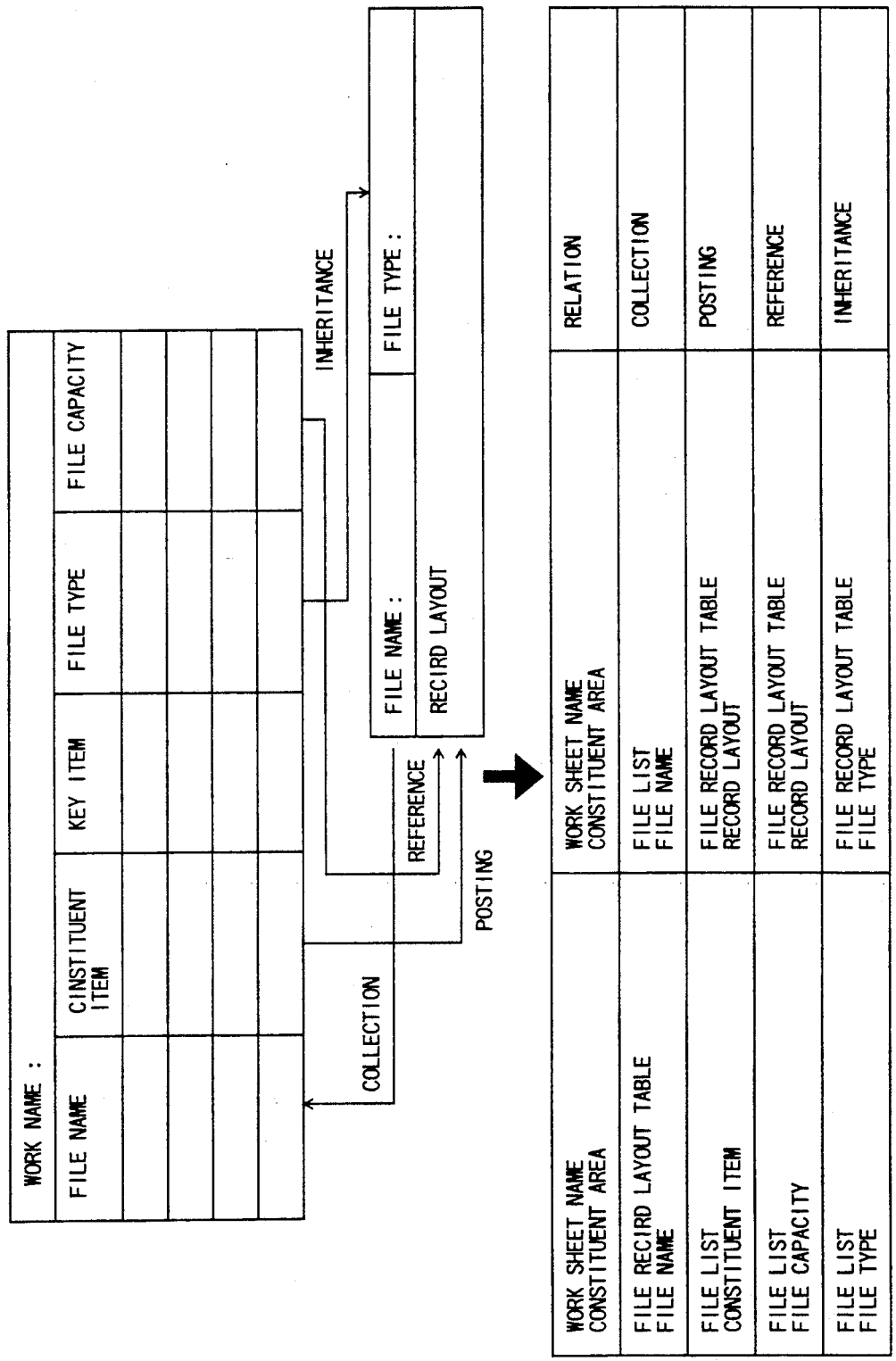
FIG. 23 shows the inter-area relation library.
Figure 28:
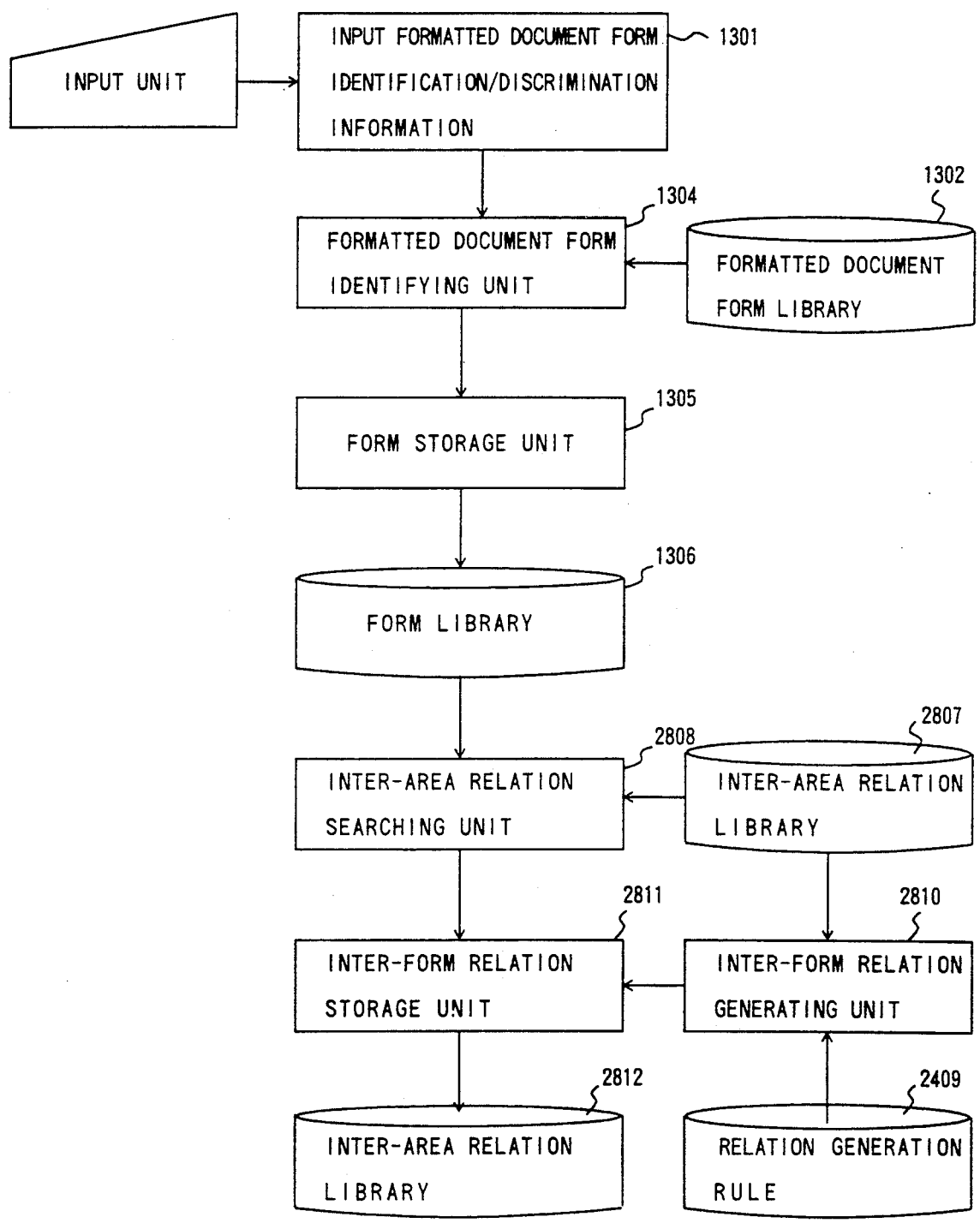
FIG. 28 is a flow chart modified from the flow chart of FIG. 25, for use with the relation between areas.

In the above embodiment, a method of forming an inter-form relation has been described. It is possible to generate an inter-form relation as well as inter-area relation, by using an inter-area relation library which stores a relation between areas constituting a work sheet form, instead of using the relation library 2407 shown in FIG. 24. This system arrangement is shown in FIG. 28. The difference from the procedure shown in FIG. 24 resides in that an inter-area relation library 2807 for storing the relation between areas constituting a work sheet form is used instead of the relation library 2407, and that the inter-form relation searching unit 2408, inter-form relation generating unit 2410, inter-form relation storage unit 2411, and inter-form relation library 2412 are replaced with an inter-form/area relation searching unit 2808, inter-form/area relation generating unit 2810, inter-form/area relation storage unit 2811, and interform/area relation library 2812, respectively. FIG. 23 shows the inter-area relation library having the storage format of inter-area relations with respect to the work sheet form "file lists" and "file record layout lists". The method of generating a relation between areas is the same as described with the flow chart shown in FIG. 25.

Embodiment 8

In the above embodiment, there has been described the method whereby discrimination information of a work sheet form is inputted, a work sheet form is identified from the formatted document form library 1302 collectively in a batch manner, and the inter-form relation of the identified work sheet form is generated by using the relation library and relation generating rule. Instead of inputting discrimination information of a work sheet form, a user may interactively derive a work sheet form directly from the formatted document form library, in order to generate the inter-form relation of the derived work sheet form. Editing such as deleting, updating and inserting may also be interactively executed for areas of an interactively identified and derived work sheet form.

Figure 29:
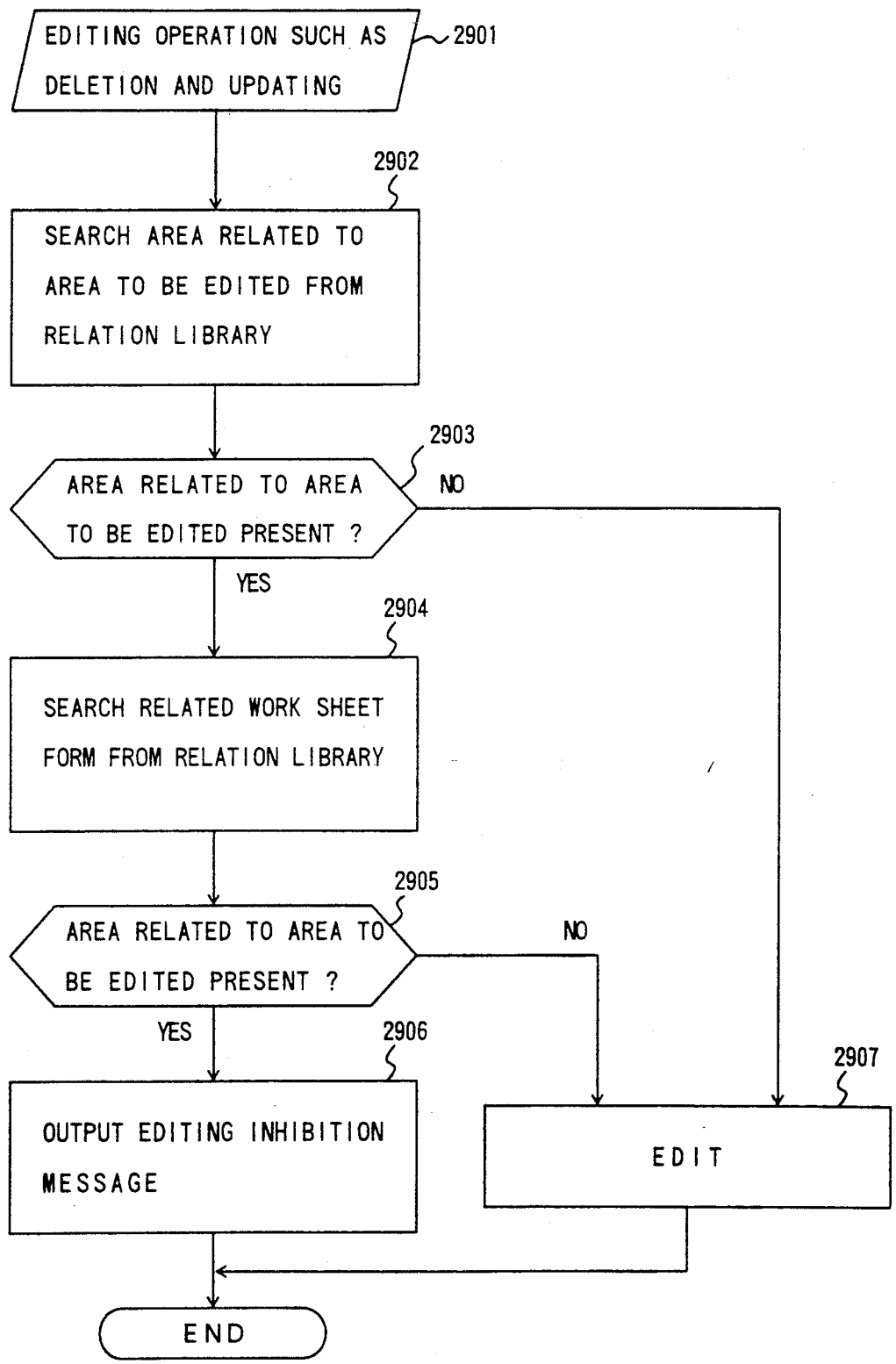
FIG. 29 is a flow chart illustrating the procedure of displaying whether editing is allowed or not, according to the eighth embodiment of this invention.

There will be described an embodiment of a method of interactively editing a work sheet form, inhibiting the editing operation, or providing the degree of influence to another work sheet form by the editing operation. FIG. 29 is a flow chart illustrating the procedure for judging if the editing operation of a work sheet form is valid or invalid and providing the judgment result, while referring to the inter-area relation library shown in FIG. 23 and storing a relation between areas constituting the work sheet form. This embodiment will now be described with reference to the flow chart. An instruction to edit (delete, update and the like) an area constituting a work sheet is entered (step 2901). An area related to the area to be edited and constituting the work sheet, is searched from the inter-area relation library shown in FIG. 23 (step 2902). It is checked whether or not there is an area related to the area to be edited (step 2903). If not, editing is executed (step 2907). If there is a related area, an area related to the searched area is searched from the inter-area relation library shown in FIG. 23 (step 2904). It is checked if the area searched at the step 2904 is the area to be edited (step 2905). If it is the area to be edited, a message to inhibit editing is outputted (step 2906). If not, editing is executed (step 2907). The above procedure will be detailed in particular with reference to FIG. 30. Assuming that an area "a4" of a work sheet form "A" which is constituted by areas "a1", "a2", "a3" and "a4" is to be deleted, the area to be edited is the area "a4" and the areas related to the area "a4" include an area "b1" of a work sheet form "B" and an area "c1" of a work sheet form "C" (step 2902). Since there are areas related to the area to be edited, an area related to the searched areas "b1" and "c1" is searched (step 2904). The search results show that an area related to the area "b1" is an area "b2", and an area related to the area "c1" is the area "a4". Namely, the area "c1" is related only to the area "a4" to be edited so that if the area "a4" is deleted, the area "c1" becomes to have no relation to any area. Therefore, deleting the area "a4" is inhibited and a message of such effect is outputted as shown in FIG. 30.

Figure 31:
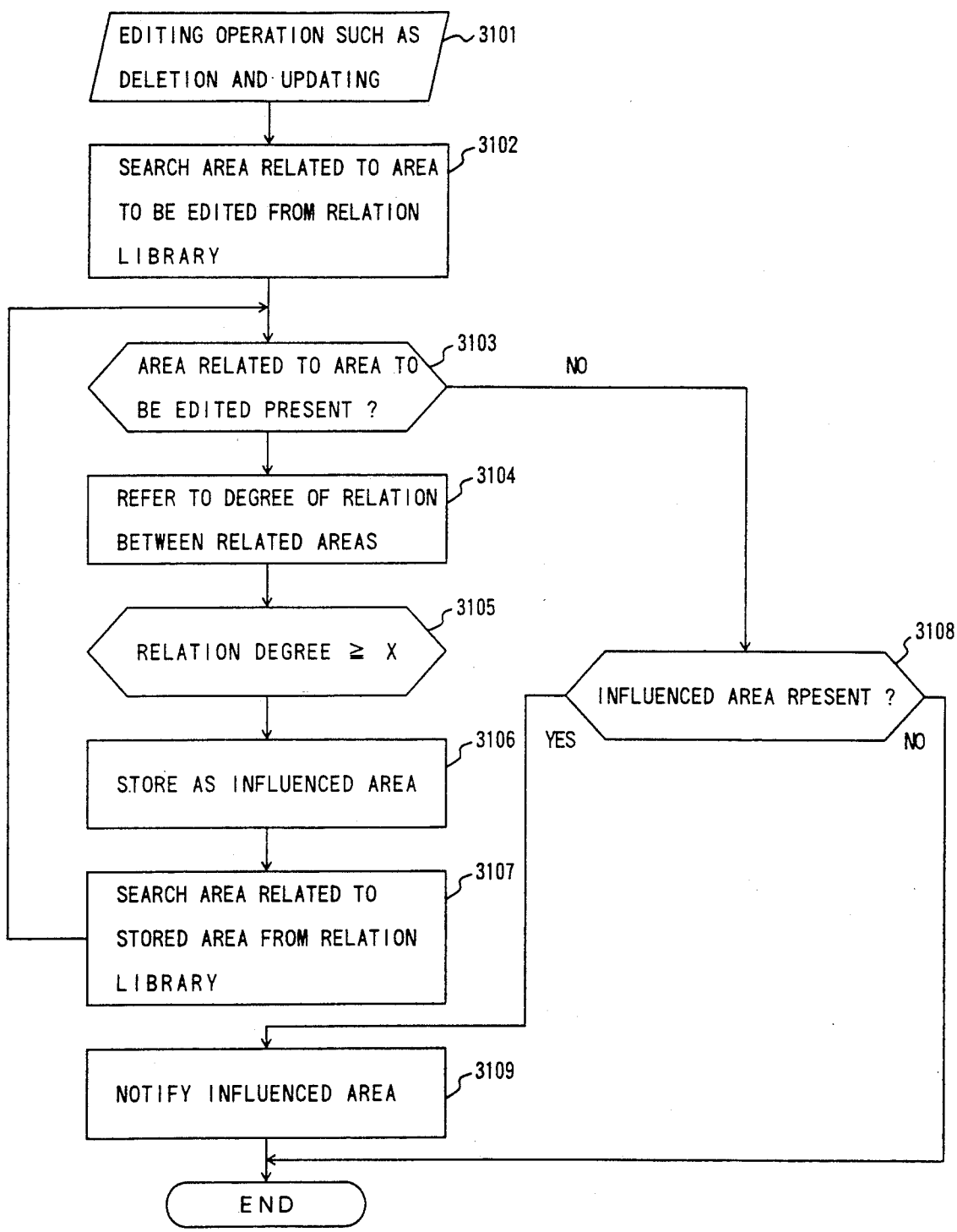
FIG. 31 is a flow chart illustrating the procedure of notifying the range of influence, according to the eighth embodiment of this invention.
Figure 32:
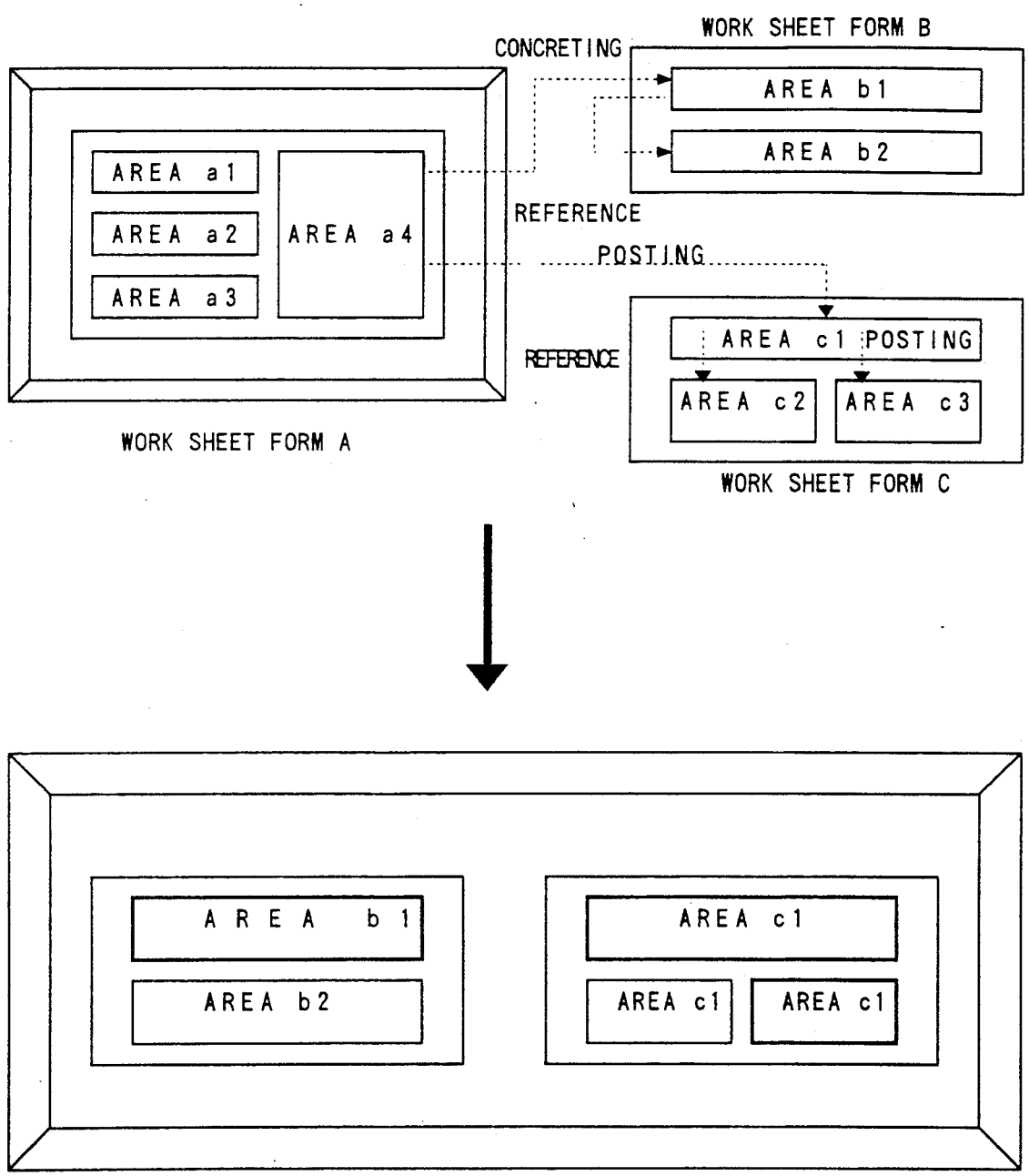

Next, there will be described the procedure of notifying the range of influence to be caused by editing an area constituting a work sheet form. The flow chart showing the procedure is shown in FIG. 31. An instruction to edit (delete, update and the like) an area constituting a work sheet form is inputted (step 3101). An area related to the area to be edited and constituting a work sheet form is searched from the inter-area relation library shown in FIG. 23 (step 3102). It is checked if there is an area related to the area to be edited (step 3103). If present, the strength of relation between related areas is referred to (step 3104). The strength of relation is the degree of relation. In this embodiment, the strength of relation is assumed as the level of hierarchy of the tree structure shown in FIG. 27. Namely, the strength of relation of the first level hierarchy is considered as "1", and that of the second level hierarchy is considered as "2". It is checked if "the strength of relation referred to" $\geq N$ (step 3105). If affirmative, the related area is stored as the area to be influenced (step 3106). The steps 3103 to 3106 are repeated (step 3108) until a related area becomes no more present (step 3107). The area to be influenced by editing and stored at the step 3106 is notified (step 3109). The above processes will be described in particular with reference to FIG. 32. Assuming that an area "a4" of a work sheet form "A" which are constituted by areas "a1", "a2", "a3" and "a4" is to be deleted, the area to be edited is the area "a4", and the areas related to the area "a4" include an area "b1" of a work sheet form "B" and an area "c1" of a work sheet form "C" (step 1302). The relation between the areas "a4" and "b1" is "concreting" and the strength of relation is "3" as appreciated from FIG. 27. The relation between the areas "a4" and "c1" is "posting" and the strength of relation is "3" (step 3104). In this embodiment, it is assumed that N=3, and the strength of relation is compared with N (step 3105). Since the relations "posting" and "concreting" are equal to or stronger than N in this case, both the areas "b1" and "c1" are stored as the areas to be influenced (step 3106). Next, the above procedure is again executed for the areas "b1" and "c1". An area related to the area "b1" and having the strength of relation equal to or larger than N is not present, whereas an area related to the area "c1" and having the strength of relation equal to or larger than N is an area "c3" having the relation "posting". From the above procedure, it can be found that the areas to be influenced by deleting area "a4" of the work sheet form "A" are the area "b1" of the work sheet form "B", areas "c1" and "c3" of the work sheet form "C". Therefore, the area "b1" of the work sheet form "B" and the areas "c1" and "c3" of the work sheet form "C" are notified as the range of influence.

In providing a relation between formatted document forms by identifying a formatted document form group corresponding to the system type to be developed while referring to the formatted document form library, the relation between formatted document forms may be provided in accordance with an inter-area relation derived from the inter-area relation libray if the areas constituting the work sheet form are already registered.

Embodiment 9

Figure 33:
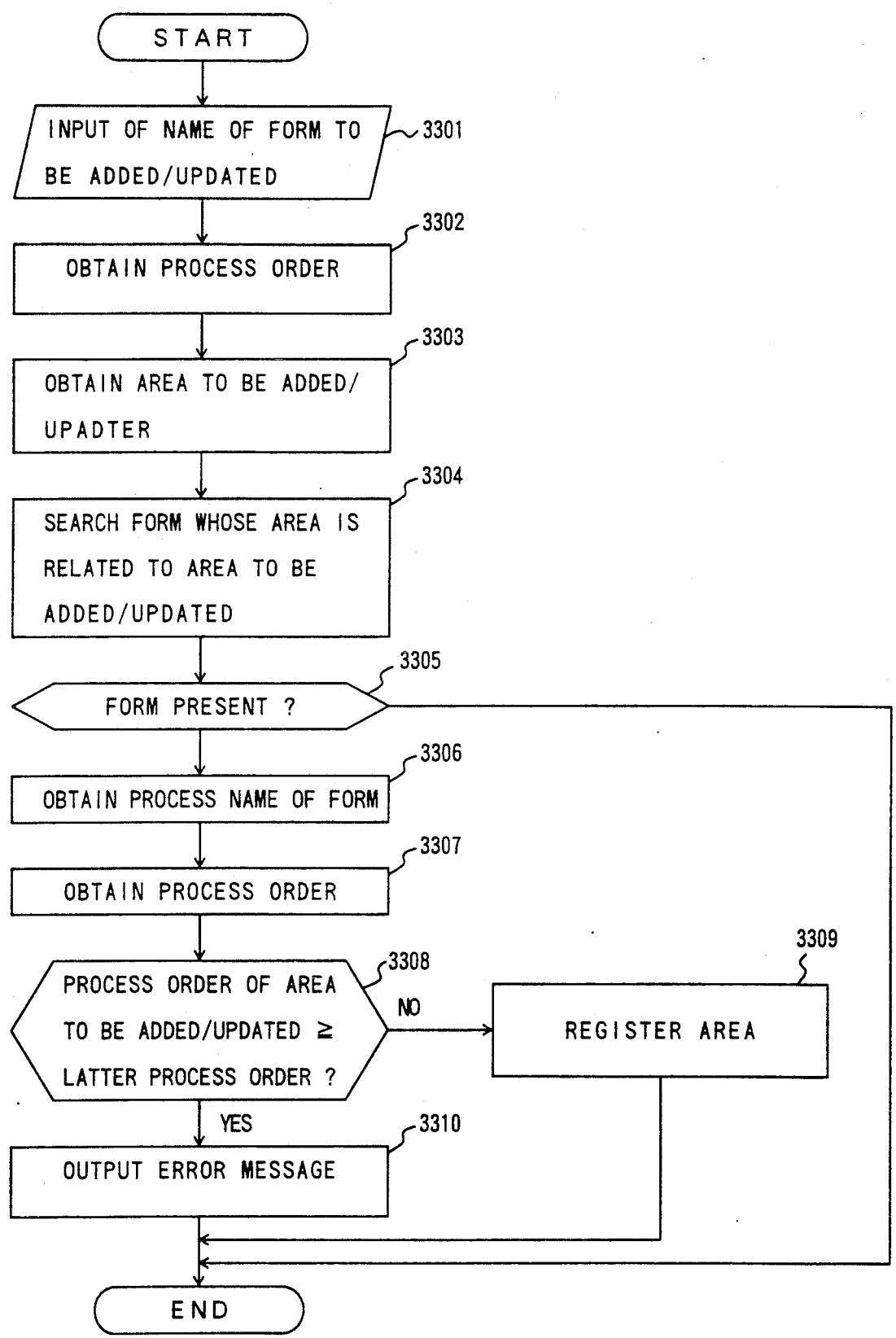
FIG. 33 is a flow chart illustrating the procedure of updating a form according to the ninth embodiment of this invention.
Figure 34:
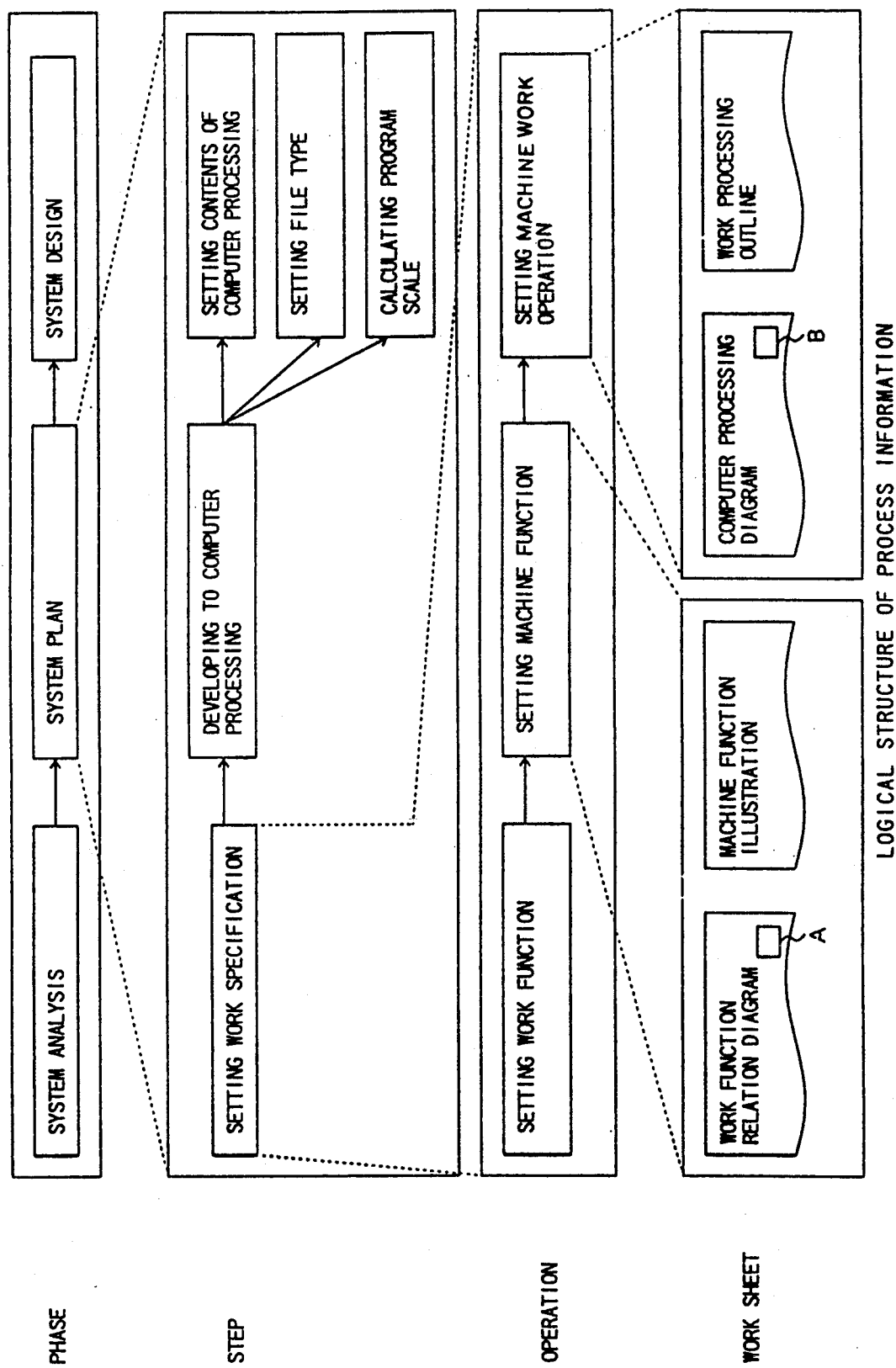
FIGS. 34A and 34B show process information.

In the above embodiments, the method of identifying a work sheet form to be described when developing software, and of providing the relation between work form sheets have been described. In this embodiment, there will be described a method of managing the processes of development in relation to the above method. First, there will be described a support method of editing a work sheet form while causing the development processes to be referred to the work sheet form, inter-form relation, and inter-area relation. FIG. 33 is a flow chart illustrating such a support method. Process information includes a process order, process names, form discriminators and the like. The physical and logical structures of process information are shown in FIGS. 34A and 34B, respectively, the structures being described later. The support method will now be described with reference to the flow chart shown in FIG. 33. The name of a work sheet form to be edited (added, updated and the like) is entered (step 3301). The process name corresponding to a form discriminator of the form in concern as well as the process order is obtained from the process information (step 3302). Next, an inputted area to be edited is fetched (step 3303). A form having an area related to the fetched area is searched from the inter-area relation table (step 3304). If such a form is present (step 3305), the process name and order of the form are obtained from the process information (steps 3306 and 3307). The process order obtained at the step 3302 is compared with the process order obtained at the step 3307 (step 3308). If the process order obtained at the step 3307 is smaller than that of the process order obtained at the step 3302, an error message is outputted (step 3310). If larger, the area fetched at the step 3303 is registered in the inter-area relation table (step 3309). The process at the step 3308 will be described in particular. For example, it is assumed that there is a relation "inheritance" between an area "A" of a work sheet to be described at a process "setting machine function" and an area "B" of a work sheet form to be described at a process "setting machine work operation". In this case, the area "B" cannot be defined in an area of the work form sheet to be described at the process "setting machine function" which is the preceding process of the process "setting machine work operation". The reason is that the data in the area "A" to be supplied to the process "setting machine work operation" is not still defined at or before the process "setting work function". In the above manner, an area to be added/updated is checked in accordance with the process order at the time of editing the work sheet, thereby ensuring process integrity.

Figure 35:
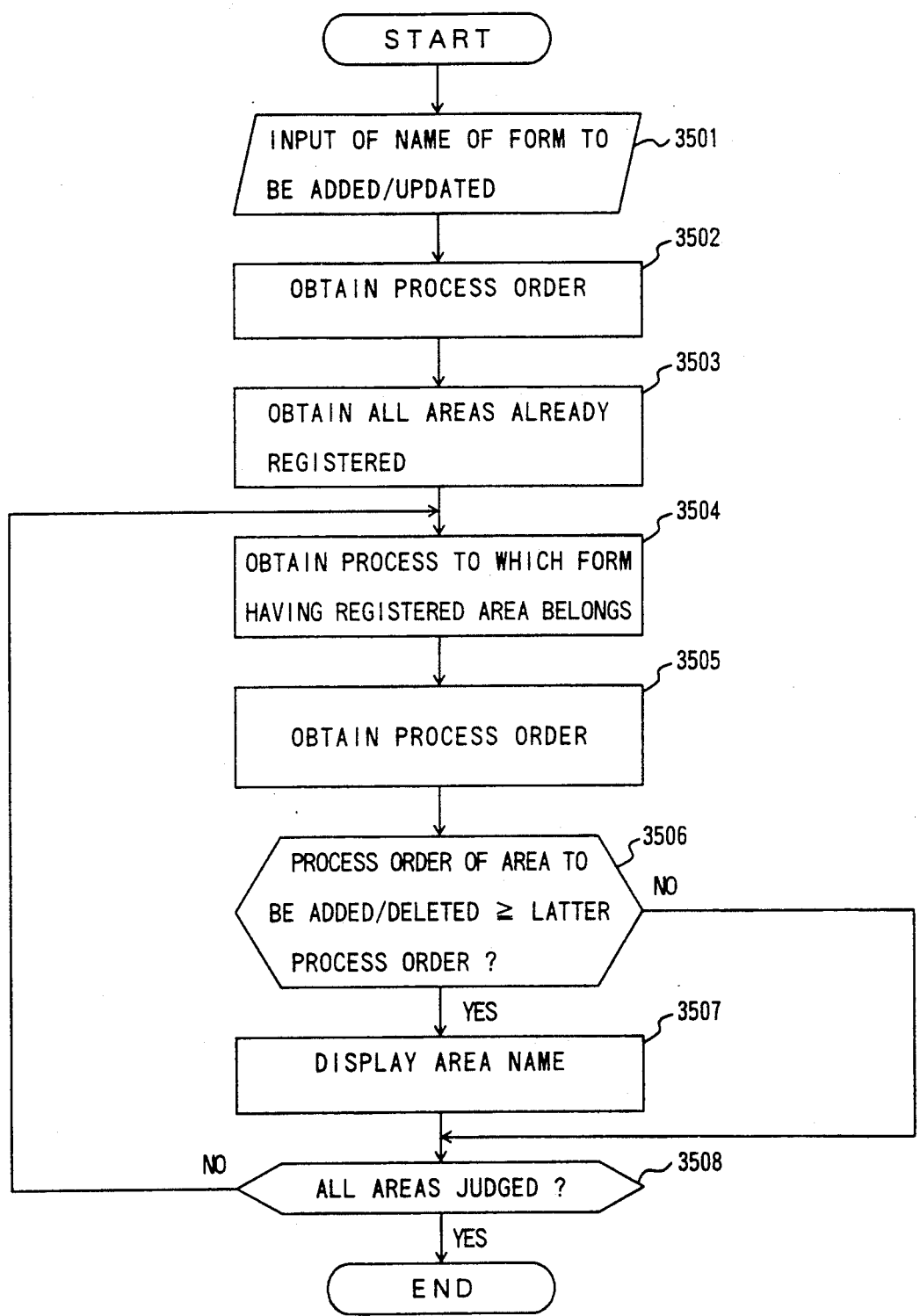
FIG. 35 is a flow chart illustrating the procedure for identifying a usable area at a process according to the ninth embodiment.

In contrast to the above-described method, there is another method of identifying an area of a work sheet form capable of being edited (added, updated and the like) while referring to the formatted document form library and notifying it to a user. FIG. 35 is a flow chart illustrating such a method. The procedure thereof will be described below with reference to the flow chart. The name of a form to be edited (added, updated and the like) is entered (step 3501). The process name and order corresponding to the inputted form name are obtained from the process information shown in FIG. 34 (step 3502). All areas stored in the formatted document form library are obtained (step 3503). An area related to the obtained area is obtained from the inter-area relation library, and the process name of a form having the related area is obtained from the process information (step 3504). The process order corresponding to the process name is obtained (step 3505). The steps 3503 to 3505 will be described in particular with reference to FIG. 34B. It is assumed that a work sheet form to be described at the process "setting machine work operation" is edited (added, updated, and the like). First the area "B" constituting the work sheet form is obtained, and the area "A" related to the area "B" is obtained. A form constituted by the area "A" is obtained, the process name of the form is obtained, and the process order corresponding to the process name is obtained. Next, the process order obtained at the step 3505 is compared with that obtained at the step 3502 (step 3506). If the process order obtained at the step 3505 is smaller, the area is displayed (step 3507). The steps 3504 to 3507 are executed for all areas obtained at the step 3503. In this manner, an area of a work sheet form capable of being edited (added, updated, and the like) can be notified to a user.

The process information shown in FIGS. 34A and 34B will be described. In developing software, processes are generally managed by hierarchically classifying them. In this embodiment, the process information is provided while giving the relation between processes and a work sheet form to be described at the lowest hierarchy level. FIG. 34A shows the logical structure of the process information, and FIG. 34B shows the physical structure of the process information. The processes are managed as three hierarchical levels including "phase", "step", and "work", and there is shown the relation between the lowest hierarchy level process "work" and work sheet forms to be described at the process. By managing the process information in the above manner, it becomes possible to display the processes hierarchically, to provide work sheet forms to be described at each hierarchy level, and to manage the processes of computer system design and development.

Figure 36:
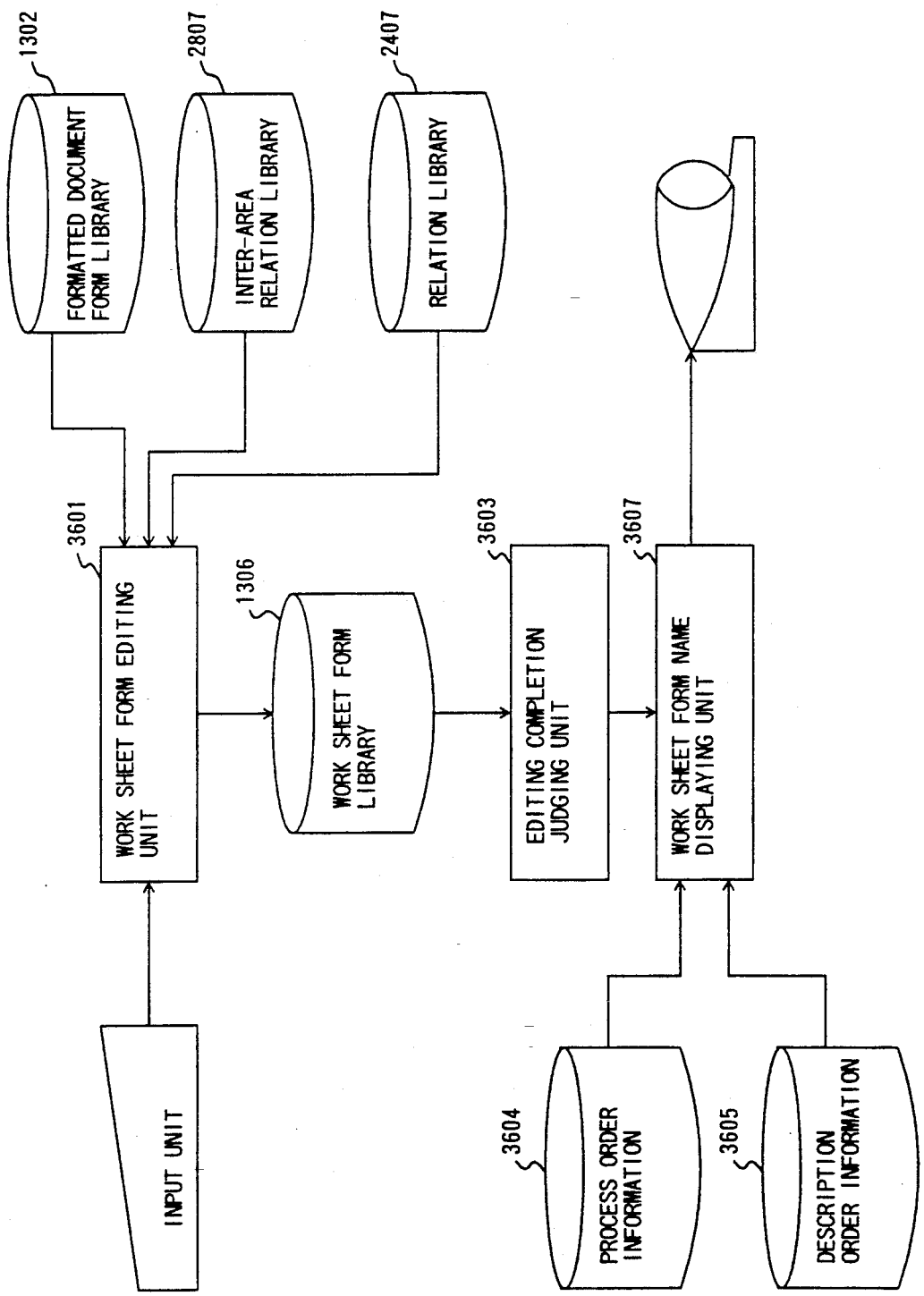
FIG. 36 is a functional block diagram showing the procedure of guiding a process by using the process information of the ninth embodiment.

Software development can be guided in accordance with the relation between development processes and work sheet forms, and in accordance with the information of the order of describing work sheet forms. FIG. 36 is a flow chart illustrating such arrangement. A work sheet editing unit 3601 derives a form from a formatted document form library 1302, an inter-area relation from an inter-area relation library 2807, and an inter-form relation from a relation library 2407. Upon input of software specification information or the like by a user, the inter-area and inter-form relations are identified to edit a work sheet form. A work sheet edit completion judging unit 3603 judges if input of specification information or the like to a work sheet form has been completed or not. A work sheet form name providing unit 3607 provides a user with the name of a work sheet form to be next described, in accordance with process order information 3604 and description order information 3605. In this manner, a form of a work sheet to be described can be notified to a user properly so as to match the advancement of development at that time. In accordance with the identified relation between work sheet forms and between areas, the range of influence by a change of specification information or the like can be grasped easily.

Figure 37:
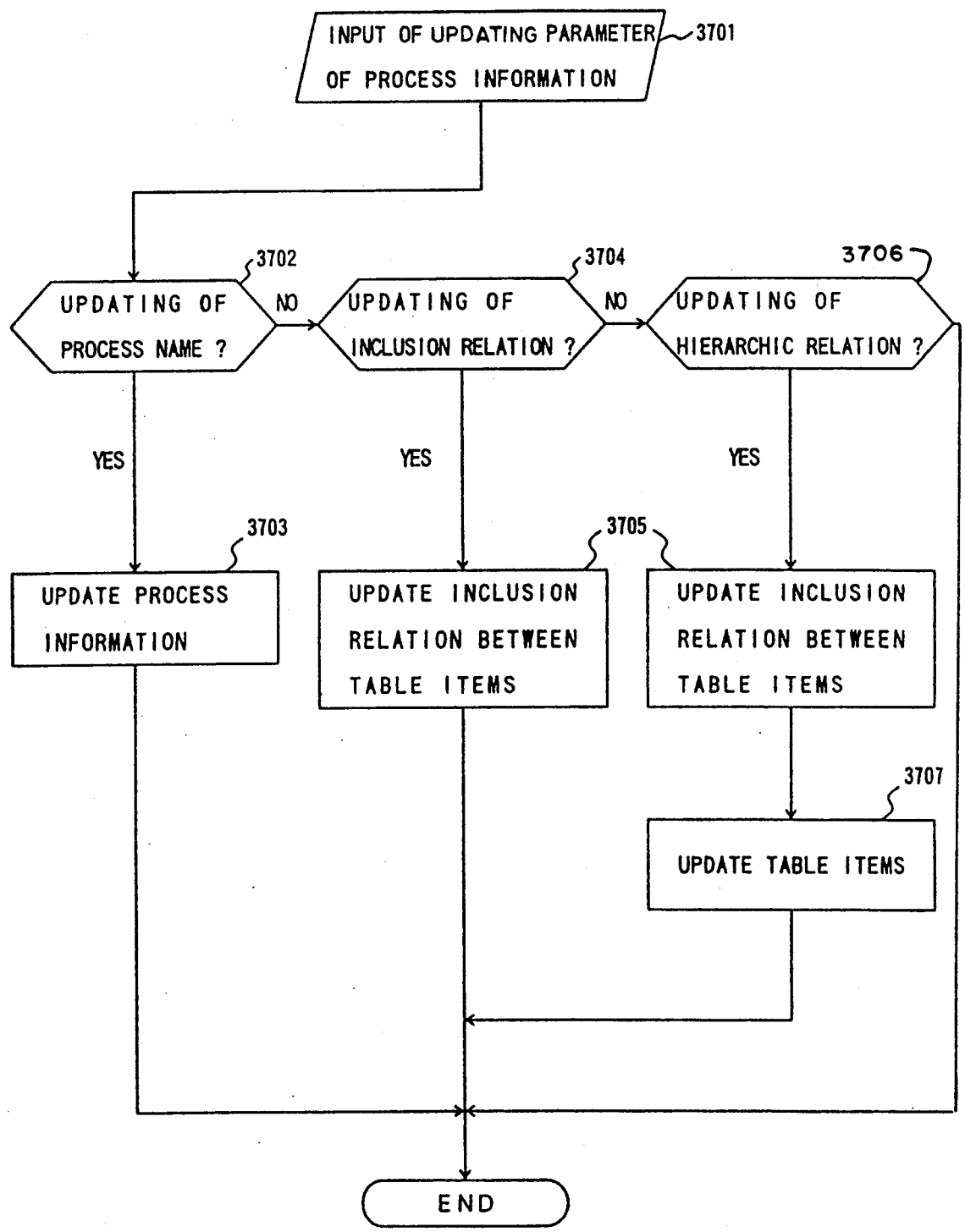
FIG. 37 is a flow chart illustrating the procedure of editing the process information of the ninth embodiment.
Figure 38:
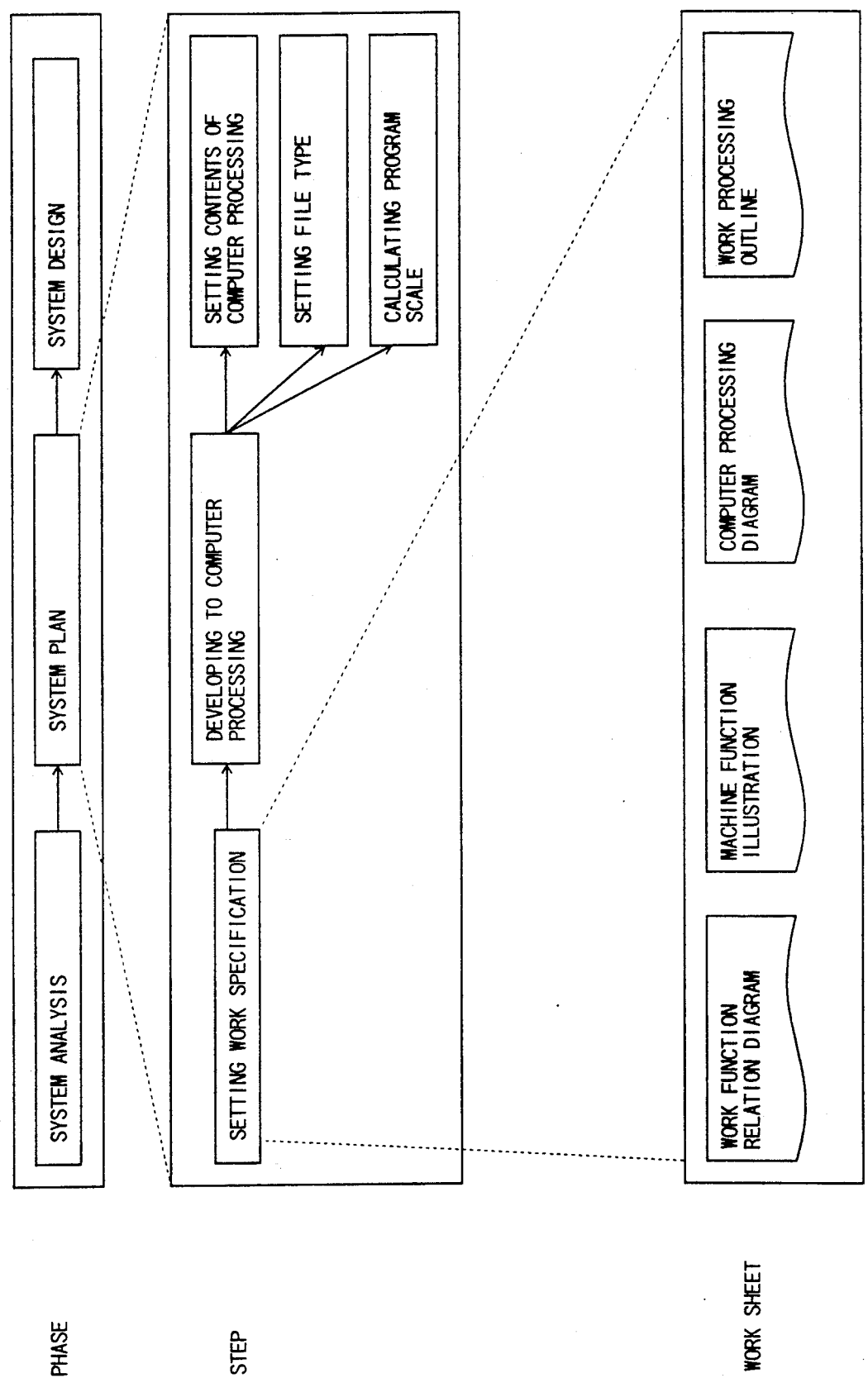
FIG. 38 shows an example of editing the process information.

It is also possible to update the structure (hierarchy, process and the like) of the process information shown in FIGS. 34A and 34B. FIG. 34A shows the physical structure of the process information. In this embodiment, the number of hierarchy levels is "3", the highest level is called a "phase", the middle level as a "step", and the lowest level as a "work". This procedure will be described with reference to the flow chart shown in FIG. 37. A parameter for updating the process information is inputted (step 3701). The parameter represents a number of hierarchy levels of processes, a process name, and a inclusion relation between processes. In accordance with the inputted parameter, there is discriminated one of updating the number of hierarchy levels of processes, updating the process name, and updating the inclusion relation between processes (steps 3702, 3704, 3706). In the case of updating the process name, the name in the process name column (phase name column, step name column, and work name column) of the physical table of the process information shown in FIG. 34A is updated to a new name (step 3703). In the case of updating the inclusion relation between processes, changed to a new relation is the inclusion relation between processes in the physical table of the process information (step 3705). In the case of updating the number of hierarchy levels of processes, inclusion relation between processes in the physical table of the process information is updated (step 3705). The item in the table which became unnecessary upon updating is deleted, or an item which became necessary is added (step 3707). The above processes will be described in particular with reference to FIG. 38. FIG. 38 illustrates an example of updating the number of hierarchy levels of the process information shown in FIGS. 34A and 34B, namely an example of changing the hierarchy levels to two levels of "phase" and "step" by inputting a corresponding parameter. In FIGS. 34A and 34B, a phase process "system plan" contains a step process "setting work specification" which in turn contains a work processes "setting work function", "setting machine function", and "setting machine work operation". Since the processes "work" in FIG. 34B become unnecessary, a relation between process items "step" and "work sheet" is obtained (step 3705), and a process item "work" is deleted (step 3707). As a result, the process information is updated as having two hierarchy levels as shown in FIG. 38.

Figure 39:
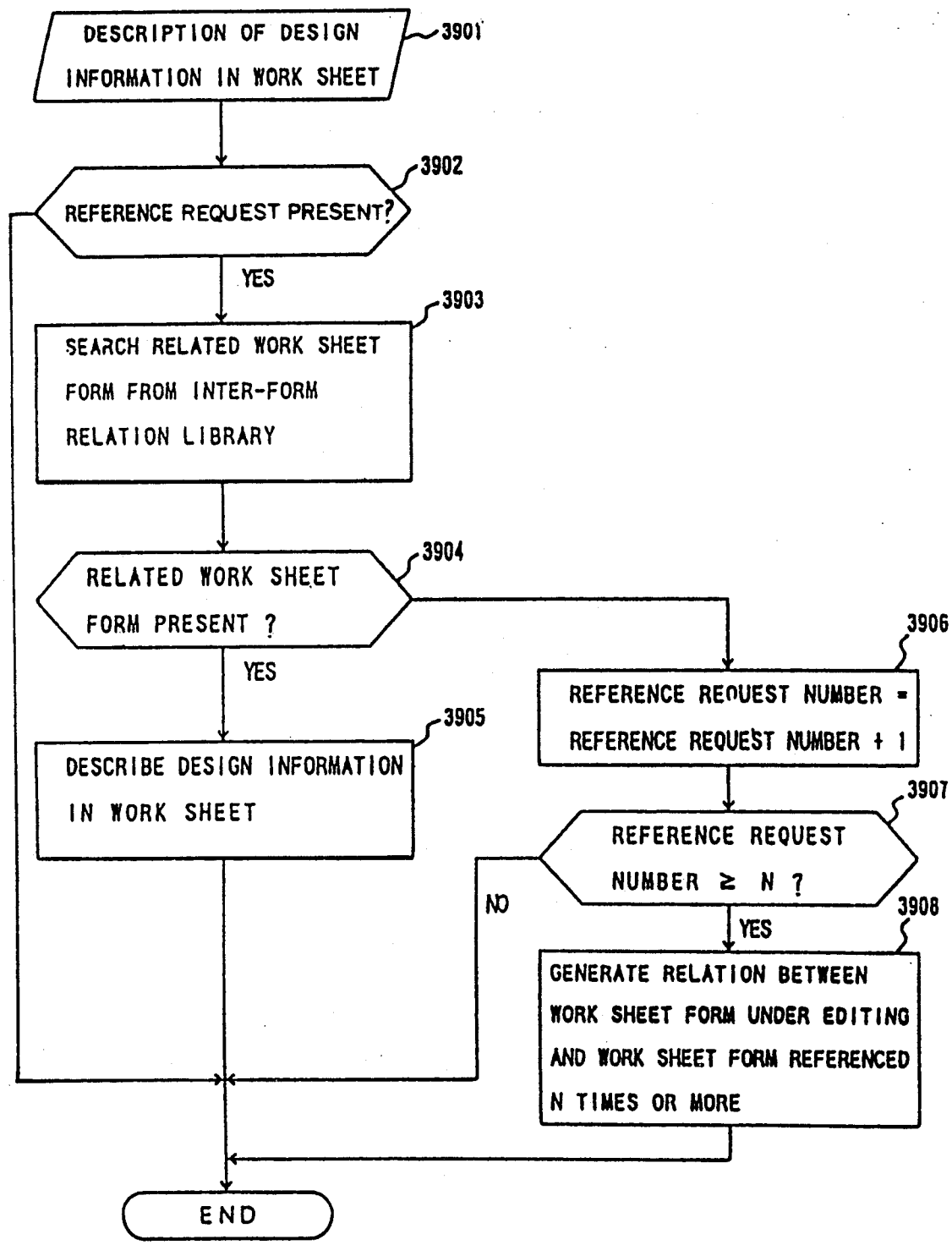
FIG. 39 is a flow chart illustrating the procedure of newly generating an undefined relation while describing design information according to the ninth embodiment.

Next, there will be described another embodiment wherein a new relation between work sheet forms is defined during the process of describing design information in an identified work sheet form, while referring to the relation between work sheet forms. The procedure of this embodiment will be described with reference to the flow chart shown in FIG. 39. During the process of describing design information in a work sheet form (step 3901), it is checked if there is a request of reference to another work sheet form with respect to the described design information (step 3902). If there is a request, a work sheet form related to the work sheet form now in concern is searched from the relation library (step 3903), and it is checked if there is any related work sheet form (step 3904). If present, the described design information is described in the related work sheet form (step 3905). If not, the number of reference requests is stored as log information (step 3906). If the number of reference requests is equal to or larger than a predetermined value N (step 3907), a new relation is defined between the work sheet form under editing and the work sheet form to which the reference request was issued N times or more (step 3908). The value N can be determined by a user and so the procedure may be customized as the user desires. The relation between work sheet forms has been described above. It is also possible to define a new relation between areas by using the inter-area relation library which stores a relation between areas constituting a work sheet form.

Embodiment 10

There will be described an attribute of a "relation" in the inter-area relation library shown in FIG. 23. Consider now for example "inheritance", "reference", and "collection" as the types of relation attribute. The attribute "inheritance" means that a part or whole or the contents in an area of a work sheet form is inherited to another area. If this attribute is added to related areas, specification information or the like entered at the time of editing can be entered in other related areas, thereby dispensing with repetitive inputs of the same contents. Furthermore, the range of influence by a change of specification information or the like can be readily grasped by sequentially tracing the areas having the attribute "inheritance". The attribute "reference" means that the area having this attribute has the contents to be referred to by the area entering specification information or the like, thereby readily allowing a reference to the contents. The attribute "collection" is defined in a relation between an area of a work sheet form in which management information is described and an area of a work sheet form in which production information such as software specifications is described, so that the data regarding the advancement of development can be automatically collected from the production information such as specification information.

Figure 40:
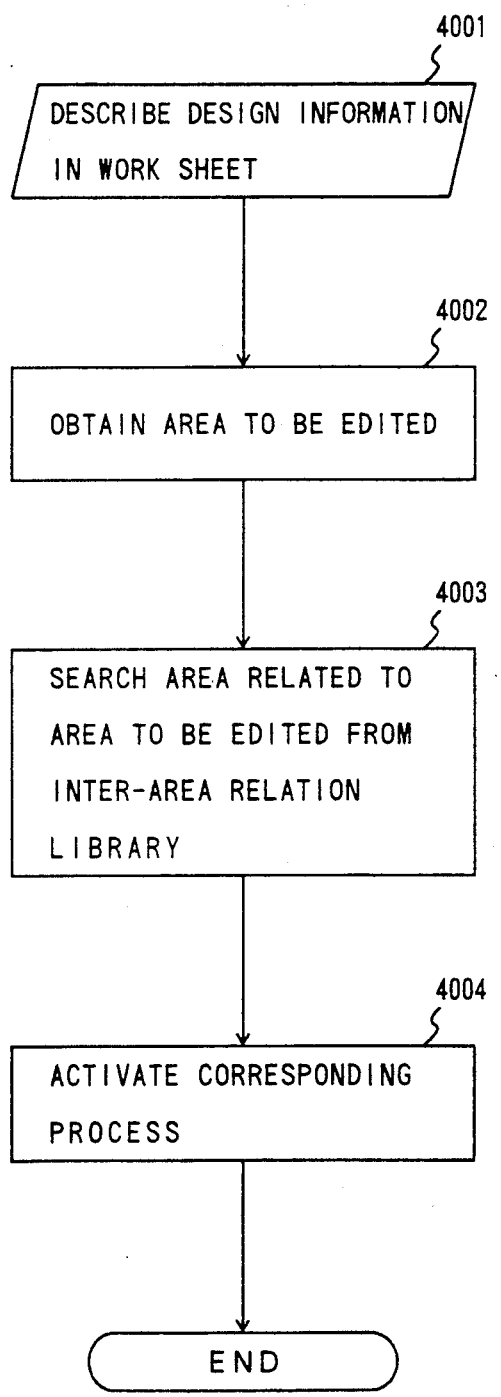
FIG. 40 is a flow chart of the tenth embodiment of this invention.

The attribute of an area constituting a work sheet form may be managed in the form of a process which supports the operations of describing design information in the area, and hence supports of designing-/developing a system becomes possible by activating the process when necessary. This arrangement will be described with reference to FIG. 40. Design information is described in a work sheet form (step 4001), an area to be edited is obtained (step 4002). An area related to the area to be edited, and the process which supports the operation of describing design information in the area to be edited, are searched from the inter-area relation library (step 4003). Using as an index key the area searched at the step 4003, the process searched at the same step 4003 is activated (step 4004). A particular example which activates a "posting" process is shown in FIG. 41. In this example, the "posting" process causes the data items described in an area "constituent element" of the work sheet form "file list" to be displayed on the edited screen of "file record layout specification".

Embodiment 11

Figure 42:
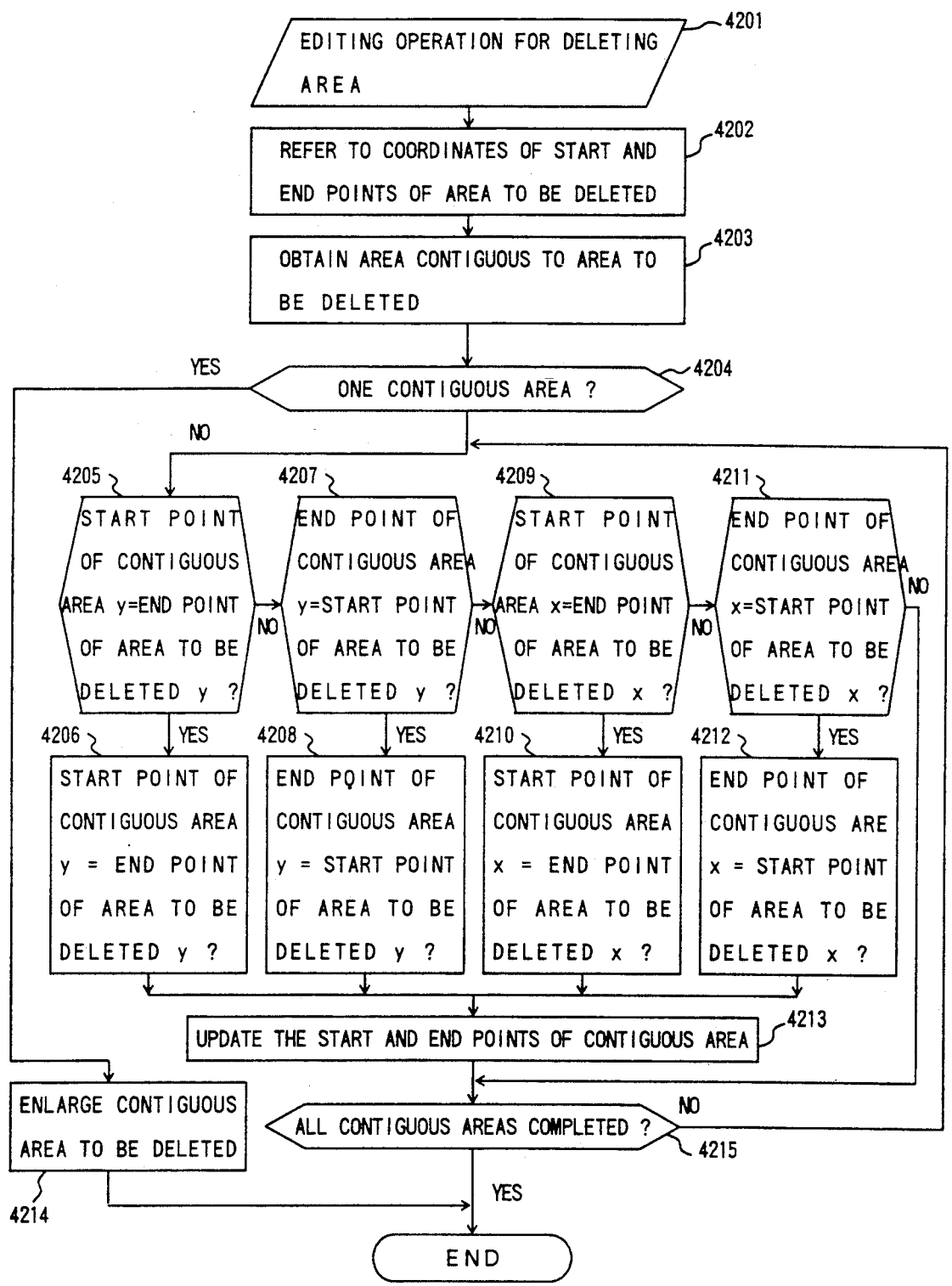
FIG. 42 is a flow chart of the eleventh embodiment of this invention.
Figure 44:

Next, there will be described an embodiment which provides a layout of areas after deleting an area of a work sheet form. The procedure of this embodiment is shown in the flow chart of FIG. 42. FIG. 43 is a graphics information table of a work sheet form, the table registering the areas constituting a work sheet and the graphics information of the areas. This embodiment will be described with reference to the flow chart. An instruction to edit, i.e., delete an area of a work sheet form is inputted (step 4201). The coordinates of the start and end points of an area to be deleted are obtained while referring to the graphics information table of the work sheet form shown in FIG. 43 (step 4202). An area contiguous to the area to be deleted is obtained from the work sheet form graphics table (step 4203). It is checked if there is one contiguous area or not (step 4204). If there is one contiguous area, the contiguous area is enlarged to cover the area to be deleted (step 4214). If there are a plurality of contiguous areas, the positional relation to the area to be deleted is analyzed in accordance with judgment steps 4205, 4207, 4209, and 4211 to thereby determine the area to be enlarged. The start and end points of the area to be enlarged are changed at steps 4206, 4208, 4210, and 4212 to update the graphics information of the work sheet form graphics information table shown in FIG. 43 (step 4213). The steps 4205 to 4213 are repeated for all areas contiguous to the area to be deleted (step 4215). The above procedure will be described in particular with reference to FIG. 44. Assuming that an area "error countermeasure" of a work sheet form "module specification" is to be deleted, the contiguous areas are areas "contents" and "process flow" (step 4203). The area "contents" cannot be enlarged, whereas the area "process flow" can be enlarged. Thus the area "process flow" is enlarged (steps 4205 to 4212). Updated are the coordinates of the area "process flow" in the graphics information table within the work sheet form graphic information table shown in FIG. 43 (step 4213). The particular example of the above procedure is shown in FIG. 44 which shows that the area "process flow" is enlarged after the area "error countermeasure" was deleted.

Embodiment 12

Figure 45:
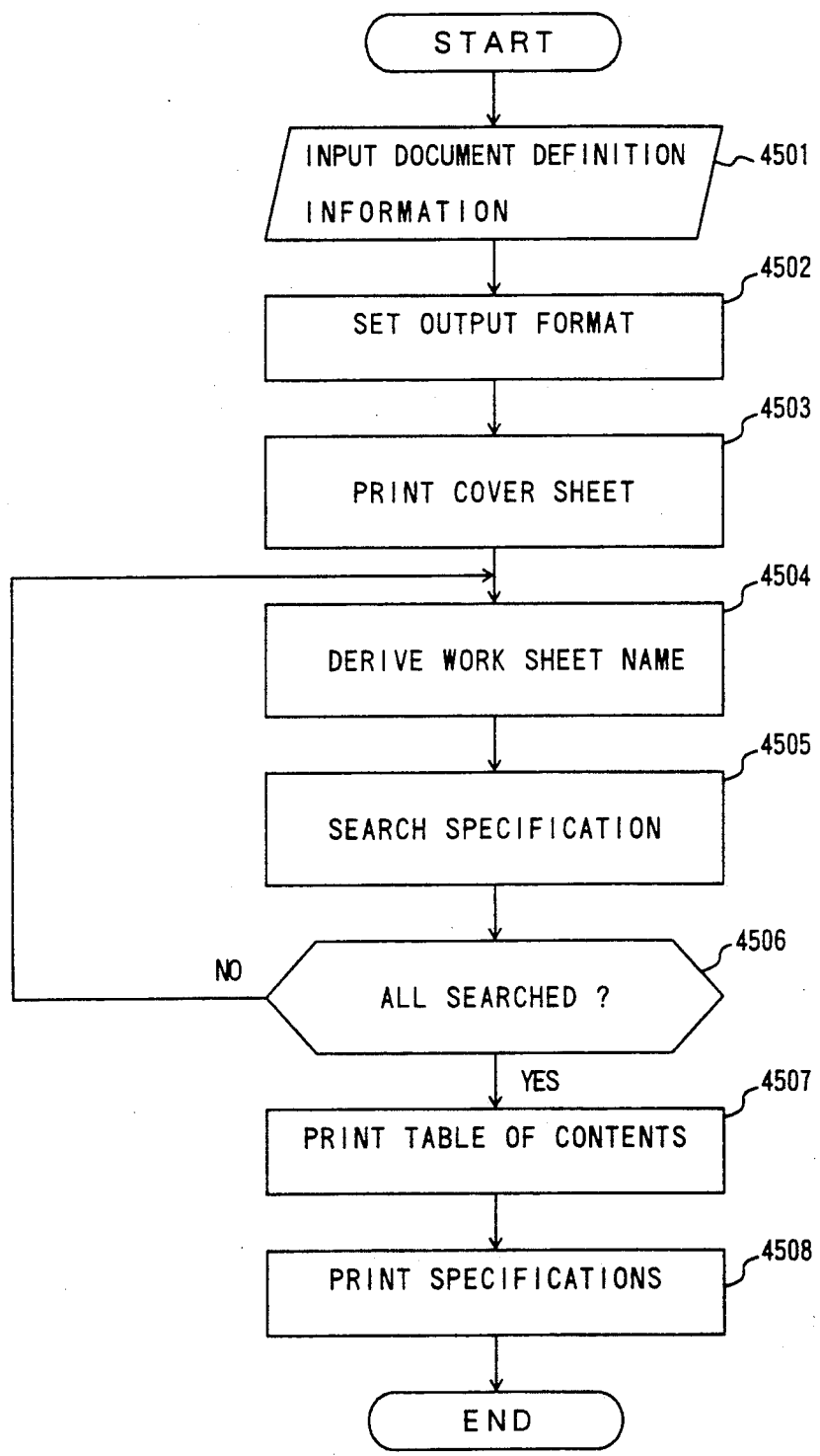
FIG. 45 is a flow chart of the twelfth embodiment of this invention.

This embodiment allows to automatically collect a plurality of documents and print them out as one final document, by entering document definition information. The procedure of this embodiment shown in the flow chart of FIG. 45 will be described. Document definition information defining a list of documents is inputted (step 4501). An example of the document definition information is shown in FIG. 46, which is composed of a cover sheet information, output information, and collection information. The cover sheet information is composed of a document title, system name, author name, and supervisor name. The output information is composed of a sheet size, output style, and character size. The collection information is composed of the names of specification types to be collected. The output style is set (step 4502), and a cover sheet is printed out (step 4503). At this time, the print data is automatically calculated and printed out. The names of work sheets to be collected are derived (step 4504), and the specifications constituting the final document of the system are searched by using, as a search key, the system name (step 4505). After all specifications are searched (step 4506), a table of contents is printed out (step 4507). All the searched specifications are printed out (step 4508) to complete the procedure.

As described so far, according to the present invention, there is eliminated inconvenience of extending links each time a plurality of related documents are made. Moreover, the form of a formatted document and the relation between documents can be defined independently from an editor, thereby allowing to readily change the form or relation.

Furthermore, forms of formatted documents such as specifications and the like to be described when developing software are stored beforehand in a formatted document form library, and a desired formatted document form within the formatted document form library is identified in accordance with the type of a system to be developed and its environments. Therefore, a burden on a user can be reduced in defining a formatted document form required for software development and an unnecessary formatted document form. Furthermore, the relation between forms and between areas constituting a form is generated at the time of making a formatted document. Therefore, a user is not required to define such relations between forms and between areas one after another, thereby reducing a burden of definition work which has been carried out manually heretofore.

Moreover, even if a user edits (adds, updates and the like) a formatted document already defined, the relation between newly added/updated forms and areas and already defined forms and areas is automatically generated, so that a formatted document form can be readily customized as desired.

Furthermore, an edited area is checked if it has any contradiction from the viewpoint of development processes. Therefore, integrity of formatted document forms can be retained.

Still further, the inter-area relation as well as an area attribute is managed. As a result, while referring to the attribute relation between areas, the management information regarding the advancement of development and the like can be collected in accordance with the specifications and the like such as production information described when developing software. In addition, it is easy to search the related specification information during the process of editing specification information.

Furthermore, in updating a formatted document form or areas constituting the form, the range of influence by such updating to another formatted document form or areas constituting the other form is identified from the relation between those to be updated and those already defined, and notified to a user. Therefore, integrity between formatted document forms to be described when developing software can be retained.

Still further, a desired formatted document form is derived from a formatted document form library in an interactive manner with a user, and the relation between derived formatted document forms and between areas constituting the forms is automatically produced, thereby allowing to customize as a user desires a formatted document form to be described when developing software.

What is claimed is:

1. In a data processing system comprising a processor, an input unit, a display unit and a memory, wherein a document is made in such a manner that a document format having at least one field is displayed on said display unit and information including at least one of text and graphics is generated by said processor and is written into the field of said document format responsive to an editing instruction input via said input unit by a user, a supporting method for making said document, the supporting method comprising the steps of:

designating by the user at least two document formats;

inputting via said input unit into said data processing system a format relation between said at least two document formats designated by the user;

making said document based on one of said at least two document formats;

searching, by using said format relation, another document format which is related to said one document format from which said document was made;

making another document based on said another document format;

generating, by the processor, a document relation between said document and said another document; and, storing said document relation in said memory.

2. A supporting method according to claim 1, wherein said document has information to indicate that said document is of the same document format as said one document format and said another document has information to indicate that said another document is of the same document format as said another document format.

3. In a data processing system comprising a processor, an input unit, a display unit and a memory, wherein a document is made in such a manner that a document format having at least one field is displayed on said display unit and information including at least one of text and graphics is generated by said processor and is written into the field of said document format, responsive to an editing instruction input via said input unit by a user, a supporting method for making said document, the supporting method comprising the steps of:

designating by the user at least two document formats;

inputting via said input unit into said data processing system a format relation between said at least two document formats designated by the user;

storing said input field relation in said memory;

making said document based on one of said at least two document formats;

searching, by using said field relation, a field of another document format which is related to the field of said one document format;

making another document based on said another document format;

generating, by the processor, a document field relation between a field of said document and a field of another document;

storing said document field relation in said memory;

amending description contents in the field of one of said document and said another document;

searching in response to said amending, by using said document field relation, the field of the other one of said document and said another document; and, amending description contents of the field of the other one of said document and said another document to those of the amended description contents.

4. A supporting method according to claim 1, wherein in a case where there exists a field relation between all the fields in one of said at least two document formats and the fields in another document format such that similar contents are described in each one of said all the fields in the one document format and in respective ones of said fields of the other document format, said supporting method further comprising the steps of:

inputting a user's format alteration instruction via said input unit; and, copying contents described in each of said all the fields contained in said document made from said one document format into respective ones of said searched fields contained in said other document format.

5. In a data processing system comprising a processor, an input unit, a display unit and a memory, a method of supporting making of a document, the supporting method comprising the steps of:

storing in said memory a plurality of document formats and identifiers for identifying each of said plurality of document formats;

inputting through said input unit a group of identifiers designated by a user, corresponding to at least some of said stored identifiers;

identifying from among said plurality of document formats a group of document formats which correspond to said input group of identifiers; and, storing the identified group of said document formats in said memory.

6. A supporting method according to claim 5, wherein said plurality of document formats stored in said memory are used for developing systems and said identifiers are used for grouping said systems.

7. A supporting method according to claim 5, further comprising the steps of:

designating by the user at least two document formats from among said plurality of said document formats stored in said memory;

inputting a format relation between at least two document formats;

inputting a field relation between fields of said at least two documents;

storing in said memory said format relation and said field relation;

editing, by an editing operation inputted through said input unit, at least one of said at least two document formats by one of i) adding a new document format to said at least two document formats designated and stored in said memory and ii) updating at least one of said at least two document formats;

obtaining a field contained in the edited document format;

searching, by using said input field relation, a field related to the field obtained;

searching a document format containing the searched field;

generating, by the processor, a format relation between said searched document format and one of said newly added and updated document; and, storing said format relation in said memory.

8. A supporting method according to claim 7, wherein said newly added document format, said field relation and said generated format relation added by the used are stored in said memory as difference information.

9. A supporting method according to claim 5, further comprising the steps of:

storing in said memory said format relations between said plurality of document formats stored in said memory;

searching, by using said format relations, a document format A related to a document format B, of said identified plurality of document formats;

searching, by using said format relations, a document format C related to said searched document format A from among said identified plurality of document formats;

generating, by the processor, a format relation between said document format B and said document format C; and, storing said generated format relation in said memory.

10. A supporting method according to claim 5, further comprising the steps of:

storing in said memory said format relations between said stored document formats and also storing field relations between fields of said stored document formats;

searching, by using said field relations, that a field a of a document format A which is related to a field b of one of said group of document formats identified, on the basis of the group of identifiers designated by the user;

searching, by using said field relations, that a field c of a document format C which is related to the field a of the searched document format A, from among said identified group of document formats;

generating, by the processor, a new field relation between the field c of the document format C and the field b of the document format B; and, storing said new field relation in said memory.

11. A supporting method according to claim 5, further comprising the steps of:

storing in said memory format relations between said stored plurality of document formats and field relations between fields of said stored plurality of document formats;

inputting from said input unit into said data processing system additional document formats designated by the user, new format relations between said additional document formats and new field relations between fields of said additional document formats; and, storing in said memory said additional document formats, said new format relations and said new field relations.

12. A supporting method according to claim 11, further comprising the steps of:

inputting through said input unit an editing operation including at least one of updating and deleting a field, designated by the user, of one document format of said stored group of document formats designated by the user;

searching, by using said field relations, a field which is related to said field designated by the user to be edited;

searching, by using said field relations, a further field related to said searched field; and, inhibiting the editing operation of said field to be edited when said field to be edited is said further field.

13. A supporting method according to claim 11, further comprising the steps of:

inputting through said input unit an editing operation including at least one of updating and deleting a field, designated by the user, of a document format of said stored group of document formats designated by the user;

searching, by using said field relations, a field which is related to said field designated by the user to be edited; and, searching, by using said field relations, a field which is related to the field designated by the user to be edited; and, displaying the searched field.

14. A supporting method according to claim 5, further comprising the steps of:

storing format relations between said stored document formats and field relations between fields of said stored document formats;

searching, by using said field relations, an indirect relation such that a field a of a document format A is related with a field c of a document format C through a field b of a document format B;

generating, by said processor, a new document relation between said document format A and said document format C; and, storing said new document relation in said memory.

15. A supporting method according to claim 5, further comprising the steps of:

storing in said memory format relations among said stored document formats, field relations among fields of said stored document formats, names of a plurality of phases for developing a software, a phase order of said phases and a phase-format relation between each phase and document formats used in each said each phase;

inputting through said input unit an editing operation for editing a document format of the group of document formats designated by the user;

searching, by using said format relations, another document format which is related to said document format designated in a relation such that said another document format refers to description contents of said designated document format to be edited;

searching, by using said phase-format relations, a phase which uses said document format to be edited and also searching a phase which uses said searched another document format;

checking, by using said phase order, to know whether the phase which uses said document format to be edited is a prior phase to the phase which uses said searched another phase; and, storing in said memory the edited document format, a format relation and a field relation, when the phase if the prior phase said format and field relations being generated as a result of the editing.

16. A supporting method according to claim 15, further comprising the steps of:

searching, by using said phase-format relations, said phase which uses a document format to be edited designated by the user;

searching, by using said phase order, a prior phase to the phase which uses said document format to be edited designated by the user;

searching, by using said phase-format relations, a document format to be used by said prior phase; and, displaying on said display unit a notification that a field contained in said searched document format to be used by said prior phase is available as said field of said document format to be edited.

17. A supporting method according to claim 15, wherein said storing step further stores in said memory inclusion relations among sub-phases obtained by breaking down each phase;

displaying, on said display unit, said sub-phases hierarchically in the form of menu by using said inclusion relation;

inputting from said input unit a phase selected by the user from said displayed sub-phases;

searching by using said phase-format relations a document format used in a phase selected by the user; and, displaying said searched document format on said display unit.

18. A supporting method according to claim 17, further comprising the steps of:

searching, by using said phase-format relations, said phase which is related to a desired document made by a user based on a desired document format;

searching, by using said phase order, a next phase which comes after said searched phase;

searching, by using said phase-format relations, another document format from which a next document is to be made at said next phase; and, displaying, on said display unit, said searched another document format.

19. A supporting method according to claim 15, further comprising the steps of:

inputting, from said input unit, an editing instruction for editing names of processes, a phase order of said phases and inclusion relations of said phases designated by the user;

editing said names of phases, said phase order and inclusion relations among said phases, which are designated by the user and stored in said memory, on the basis of the editing instruction; and, storing edited names of phases, edited phase order and edited inclusion relations in said memory.

20. A supporting method according to claim 15, further comprising the steps of:

storing in said memory a relation between document formats and an attribute of said relation;

searching, by using said format relations, the other document format which has a relation with said document format from which said document was made, when the user made said document from one of said document formats; and, generating, by the processor, a document relation between said document and another document which is made from said searched other document format; and, storing in said memory said generated document and said attribute.

21. A supporting method according to claim 20, wherein in a case where said attribute is a referencing attribute, said searching step searches a document format which has a referencing relation with said document format from which said document was made, and said supporting method further comprising the steps of:

searching a document which was made from said searched document format having said referencing relation; and, displaying on said displaying unit said searched document.

22. A supporting method according to claim 21, further comprising the steps of:

storing in said memory a name of a document format each time said document format is referenced by the user when the user makes a document;

generating, by the processor, a reference relation between a document format of the document made by the user and said referenced document format, when the number of times said namer of the document format is stored in said memory reaches a predetermined number; and, storing said generated reference relation in said memory.

23. A supporting method according to claim 20, further comprising the steps of:

storing in said memory field relations among fields and attributes of said field relations;

searching, by using said field relations, that field of a document format which is related to a field of said document format from which said document was made, when the user made the document from said document format;

generating, by the processor, a document field relation between a field of said document and another document made from the searched document format; and, storing in said memory said document field relation and its attribute.

24. A supporting method according to claim 23, further comprising the steps of:

storing in said memory field relations and phases corresponding to said field relations; and, activating a process, when the user has made a document from a document format, the process related to a field of said document format from which said document was made by the user.

25. A supporting method according to claim 11, further comprising the steps of:

storing in said memory information regarding graphics contained in a field of said document format;

inputting from said input unit an editing instruction including at least one of updating and deleting of a field of a document format designated by the user;

editing said document format in accordance with the editing instruction of the user; and, modifying a layout of said field on the basis of said graphics information of said field.

26. A supporting method according to claim 5, further comprising the steps of:

inputting from said input unit into said data processing system a group of document formats designated by the user and also inputting information regarding a table of contents for said document formats in said group;

storing in said memory said group of document formats and said table of contents; and, collecting documents made from said document formats containing in said group in accordance with an order described in said table of contents.

27. A supporting apparatus for supporting making of a document by displaying on a display unit a document format stored in a memory, writing information including at least one of text and graphics in each field contained in said document format in accordance with an instruction input through an input unit, said supporting apparatus comprising:

means for designating by a user at least two document formats;

means for inputting through said input unit a format relation between said at least two document formats designated by the user;

means for storing in said memory said format relation in said memory;

means responsive to having made a document from one of said at least two document formats for searching a document format which is related to said one document format;

means for generating a document relation between said document made and another document made from said searched document format; and, means for storing in said memory said document relation.

* * * * *

UNITED STATES PATENT AND TRADEMARK OFFICE
CERTIFICATE OF CORRECTION

PATENT NO. : 5,144,555

DATED : September 1, 1992

INVENTOR(S) : Masato Takadachi, et al.

It is certified that error appears in the above-identified patent and that said Letters Patent is hereby corrected as shown below:

Claim 3, column 23, line 35, delete "format" and replace with --field--; and, after "between" insert --field of--.

Claim 7, column 24, line 33, delete "documents" and replace with --document formats--.

Claim 13, column 25, line 58, delete "deleting" and replace with --editing--.

Claim 13, column 25, lines 65-67, delete lines 65-67 because they are a repetition of lines 62-64.

Claim 15, column 26, line 22, delete the first occurrence of "each".

Claim 15, column 26, line 42, delete "if" and replace with --is--.

Claim 16, column 26, line 51, delete "designated by the user".

Claim 18, column 27, line 8, delete the second occurrence of "said" and replace with --a--.

Claim 21, column 27, line 54, delete the second occurrence of "displaying" and replace with --display--.

Claim 22, column 27, line 64, delete "namer" and replace with --name--.

UNITED STATES PATENT AND TRADEMARK OFFICE
CERTIFICATE OF CORRECTION

PATENT NO. : 5,144,555

DATED : September 1, 1992

INVENTOR(S) : Masato Takadachi, et al

It is certified that error appears in the above-indentified patent and that said Letters Patent is hereby corrected as shown below:

Claim 26, column 28, line 45, delete "containing" and replace with --contained--.

Signed and Sealed this

Seventh Day of September, 1993

BRUCE LEHMAN

*Attesting Officer*     *Commissioner of Patents and Trademarks*